US007007462B2

(12) United States Patent
Kitahara

(10) Patent No.: US 7,007,462 B2
(45) Date of Patent: Mar. 7, 2006

(54) COMBUSTION CONTROL APPARATUS FOR INTERNAL COMBUSTION ENGINE

(75) Inventor: Yasuhisa Kitahara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/895,408

(22) Filed: Jul. 21, 2004

(65) Prior Publication Data

US 2005/0039443 A1 Feb. 24, 2005

(30) Foreign Application Priority Data

Jul. 31, 2003 (JP) ............................ 2003-284325

(51) Int. Cl.
*F01N 3/00* (2006.01)

(52) U.S. Cl. ............................ 60/285; 60/274; 60/278; 60/286; 60/299

(58) Field of Classification Search .................. 60/274, 60/278, 285, 286, 299; 123/299, 434, 672
See application file for complete search history.

(56) References Cited

U.S. PATENT DOCUMENTS

| | | | | |
|---|---|---|---|---|
| 5,595,060 A * | 1/1997 | Togai et al. | .................. | 60/274 |
| 6,234,139 B1 * | 5/2001 | Taga et al. | .................. | 123/295 |
| 6,561,158 B1 * | 5/2003 | Yoshida et al. | ............. | 123/295 |
| 6,708,668 B1 * | 3/2004 | Yoshida et al. | ............. | 123/295 |
| 6,745,743 B1 * | 6/2004 | Abo et al. | .................. | 123/295 |
| 6,782,696 B1 * | 8/2004 | Shigahara et al. | ............ | 60/285 |
| 6,796,118 B1 * | 9/2004 | Kitahara | ...................... | 60/285 |

FOREIGN PATENT DOCUMENTS

| | | |
|---|---|---|
| EP | 1 035 315 A2 | 9/2000 |
| JP | 2000-320386 A | 11/2000 |

OTHER PUBLICATIONS

U.S. Appl. No. 10/895,423, filed Jul. 21, 2004, Kitahara.
U.S. Appl. No. 10/895,424, filed Jul. 21, 2004, Nishizawa et al.
U.S. Appl. No. 10/902,422, filed Jul. 30, 2004, Nishizawa et al.
U.S. Appl. No. 10/895,407, filed Jul. 21, 2004, Ishibashi et al.
U.S. Appl. No. 10/895,335, filed Jul. 21, 2004, Kitahara.
U.S. Appl. No. 10/902,163, filed Jul. 30, 2004, Kitahara.
U.S. Appl. No. 10/895,409, filed Jul. 21, 2004, Kitahara.
U.S. Appl. No. 10/895,286, filed Jul. 21, 2004, Kitahara.
U.S. Appl. No. 10/902,162, filed Jul. 30, 2004, Todoroki et al.

* cited by examiner

*Primary Examiner*—Thomas Denion
*Assistant Examiner*—Diem Tran
(74) *Attorney, Agent, or Firm*—Foley & Lardner LLP

(57) ABSTRACT

A combustion control apparatus operates an internal combustion engine in a split retard combustion mode during regenerating an exhaust purifier such as a NOx trap. In the split retard combustion mode, the combustion control apparatus controls a first fuel injection to cause preliminary combustion at or near top dead center, and controls a second fuel injection to cause main combustion after an end of the preliminary combustion. In this manner, the combustion control apparatus controls an exhaust gas temperature, or an exhaust air-fuel ratio, without increasing exhaust smoke. During the split retard combustion mode, the combustion control apparatus controls a quantity of the first fuel injection, in accordance with an ignition lag of the preliminary combustion.

21 Claims, 27 Drawing Sheets

COMBUSTION CONTROL APPARATUS FOR INTERNAL COMBUSTION ENGINE

BACKGROUND OF THE INVENTION

The present invention relates generally to control apparatuses for internal combustion engines, and more particularly to a combustion control apparatus for an internal combustion engine with an exhaust purifier such as a particulate filter and a NOx trap, which is configured to decrease an excess air ratio of the engine, and to raise an exhaust gas temperature of the engine, without increasing exhaust smoke.

In recent years, there have been disclosed various techniques of raising an exhaust gas temperature to activate an exhaust purifier for an engine with an exhaust purifier in an exhaust gas passage. One such technique is disclosed in Japanese Patent Provisional Publication No. 2000-320386, especially in paragraphs [0106] through [0111]. In this technique, a basic fuel injection quantity to produce a desired engine torque is calculated in accordance with an operating condition of the engine. The basic fuel injection quantity of fuel is supplied to a cylinder of the engine by multiple fuel injections near top dead center (TDC).

On the other hand, a known method of removing nitrogen oxides (NOx) from exhaust gas employs a NOx trap. The NOx trap traps NOx in oxidizing atmosphere and releases NOx in reducing atmosphere. The NOx trap also removes from exhaust gas and traps sulfur content in oxidizing atmosphere. Accordingly, a known method of releasing NOx and sulfur content trapped in NOx trap to regenerate the NOx trap is to decrease an excess air ratio to decrease an exhaust air-fuel ratio. In general, the exhaust gas temperature is raised to promote dissociation of sulfur content in addition to decreasing the exhaust air-fuel ratio, during the NOx trap releasing sulfur content.

SUMMARY OF THE INVENTION

However, the previously discussed technique is fraught with the following difficulty. The split fuel injection in the technique results in continuous combustion. In other words, a following fuel is injected into the flame produced by a preceding fuel injection. Accordingly, diffusive combustion process is predominant in the combustion produced by the second or later fuel injection. In diffusive combustion, decreasing excess air ratio leads to increasing exhaust smoke. Though this combustion control can raise the exhaust gas temperature, it has a difficulty of decreasing the excess air ratio in view of exhaust smoke. Therefore, this technique is not suitable for regeneration of a NOx trap that needs a decrease in the excess air ratio.

Accordingly, it is an object of the present invention to provide a combustion control apparatus for an internal combustion engine with an exhaust purifier such as a NOx trap and a particulate filter, which is configured to decrease an excess air ratio of the engine, and to raise an exhaust gas temperature of the engine, without increasing exhaust smoke.

In order to accomplish the aforementioned and other objects of the present invention, a combustion control apparatus for an internal combustion engine, comprises an exhaust purifier in an exhaust passage of the engine, a combustion controlling actuator for causing combustion in a combustion chamber of the engine, a controller for controlling the combustion controlling actuator, and the controller configured to perform the following, switching a combustion mode between a normal combustion mode and a split retard combustion mode, in accordance with an condition of the exhaust purifier, performing the following in the normal combustion mode, producing normal combustion to generate an output torque of the engine, and performing the following in the split retard combustion mode, producing preliminary combustion at or near top dead center, to release a predetermined quantity of heat in the combustion chamber, starting main combustion at a timing later than a start timing of the normal combustion in the normal combustion mode, after an end of the preliminary combustion, to generate the output torque of the engine, determining an ignition lag between a start timing of a first fuel injection for the preliminary combustion and a start timing of the preliminary combustion, in accordance with an operating condition of the engine, and adjusting a first fuel injection quantity of the first fuel injection, in accordance with the ignition lag of the preliminary combustion.

According to another aspect of the invention, a combustion control apparatus for an internal combustion engine, comprises a fuel injector for injecting fuel directly into a combustion chamber of the engine, a controller for controlling the fuel injector, and the controller configured to perform the following, switching a combustion mode between a normal combustion mode and a split retard combustion mode, in accordance with an operating condition of the engine, performing the following in the normal combustion mode, controlling a normal fuel injection to produce normal combustion to generate an output torque of the engine, and performing the following in the split retard combustion mode, controlling a first fuel injection to produce preliminary combustion at or near top dead center, to release a predetermined quantity of heat, starting a second fuel injection at a timing later than a start timing of the normal fuel injection in the normal combustion mode, to start main combustion after an end of the preliminary combustion, to generate the output torque of the engine, and determining an ignition lag between a start timing of the first fuel injection and a start timing of the preliminary combustion, in accordance with the operating condition of the engine, and adjusting a first fuel injection quantity of the first fuel injection, in accordance with the ignition lag of the preliminary combustion.

According to a further aspect of the invention, a combustion control apparatus for an internal combustion engine, comprises exhaust purifying means for purifying exhaust gas, combustion controlling means for causing combustion in a combustion chamber of the engine, control means for controlling the combustion controlling means, and the control means configured to perform the following, switching a combustion mode between a normal combustion mode and a split retard combustion mode, in accordance with an condition of the exhaust purifier, performing the following in the normal combustion mode, producing normal combustion to generate an output torque of the engine, and performing the following in the split retard combustion mode, producing preliminary combustion at or near top dead center, to release a predetermined quantity of heat in the combustion chamber, starting main combustion at a timing later than a start timing of the normal combustion in the normal combustion mode, after an end of the preliminary combustion, to generate the output torque of the engine, determining an ignition lag between a start timing of a first fuel injection for the preliminary combustion and a start timing of the preliminary combustion, in accordance with an operating condition of the engine, and adjusting a first fuel injection quantity of the first fuel injection, in accordance with the ignition lag of the preliminary combustion.

According to another aspect of the invention, a method of controlling combustion for an internal combustion engine including an exhaust purifier, the method comprises switching a combustion mode between a normal combustion mode and a split retard combustion mode, in accordance with an condition of the exhaust purifier, performing the following in the normal combustion mode, producing normal combustion to generate an output torque of the engine, and performing the following in the split retard combustion mode, producing preliminary combustion at or near top dead center, to release a predetermined quantity of heat in the combustion chamber, starting main combustion at a timing later than a start timing of the normal combustion in the normal combustion mode, after an end of the preliminary combustion, to generate the output torque of the engine, determining an ignition lag between a start timing of a first fuel injection for the preliminary combustion and a start timing of the preliminary combustion, in accordance with an operating condition of the engine, and adjusting a first fuel injection quantity of the first fuel injection, in accordance with the ignition lag of the preliminary combustion.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
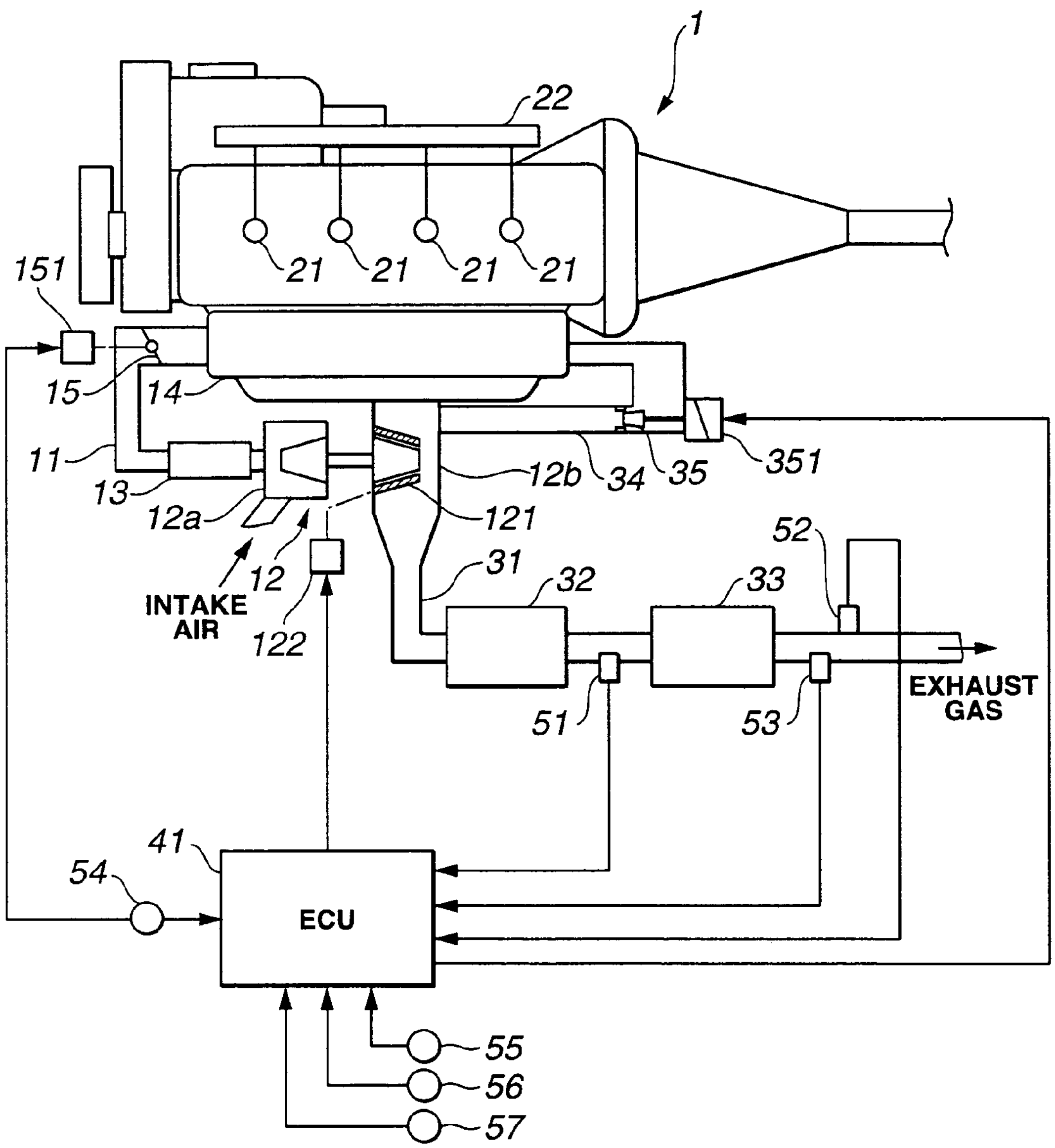
FIG. 1 is a schematic diagram depicting a diesel engine including a combustion control apparatus in accordance with an embodiment of the present invention.

Referring now to FIG. 1, there is shown a diesel engine including a combustion control apparatus in accordance with an embodiment of the present invention. Intake air flows through an air cleaner (not shown) disposed at the inlet of an intake air passage 11. The air cleaner removes dust articles from intake air. In intake air passage 11 is disposed a compressor 12*a* of a variable nozzle turbocharger 12, which compresses intake air. Downstream from compressor 12*a* is disposed an intercooler 13, which cools the compressed intake air. After cooled, intake air flows into a serge tank 14. Serge tank 14 includes a manifold section for distributing intake air to cylinders. Upstream to serge tank 14 is disposed a throttle valve 15, which varies the airflow quantity of intake air. Throttle valve 15A is connected to a throttle actuator 151 for regulating the opening thereof.

In the cylinder head of engine 1 is disposed a fuel injector 21 in each cylinder. Discharged from a fuel pump (not shown), fuel is supplied to fuel injector 21 via a common rail 22. Fuel injector 21 injects fuel directly into each combustion chamber. Fuel injector 21 is capable of injecting fuel in multiple timings in one stroke. Engine 1 is normally operated in a normal combustion mode in a normal operating mode. In the normal combustion mode, fuel injector 21 performs a main fuel injection for producing engine output torque and a pilot fuel injection prior to the main fuel injection.

Exhaust gas flows in an exhaust gas passage 31. Downstream from an exhaust manifold is disposed a turbine 12*b* of turbocharger 12. Turbine 12*b* rotates compressor 12*a,* driven by exhaust gas. Turbine 12*b* includes a movable vane 121. Movable vane 121 is connected to a vane actuator 122 for regulating the angle thereof. Downstream from turbine 12*b* is disposed a NOx trap 32, downstream from which is disposed a particulate filter such as a diesel particulate filter (DPF) 33. NOx trap 32 has different functions in accordance with an exhaust air-fuel ratio. That is, NOx trap 32 removes from exhaust gas and traps NOx during the exhaust air-fuel ratio being low or exhaust gas being lean in fuel. On the other hand, NOx trap 32 releases NOx during the exhaust air-fuel ratio being high or exhaust gas being rich in fuel. NOx released from NOx trap 32 is purified by a reducing agent such as hydrocarbon (HC) in exhaust gas. In addition to NOx, NOx trap 32 removes from exhaust gas and traps sulfur content (S). NOx trap 32 has a function of oxidizing HC and carbon monoxide (CO), in addition to the function of purifying NOx. DPF 33 includes a porous filter element as formed of ceramic. The filter element of DPF 33 filters exhaust gas to remove exhaust particulate matter. NOx trap 32 and DPF 33 serves for an exhaust purifier to trap substances in exhaust gas.

Between intake air passage 11 and exhaust gas passage 31 is disposed an EGR pipe 34. Within EGR pipe 34 is disposed an EGR valve 35. EGR valve 35 is connected to an EGR actuator 351 to regulate the opening of EGR valve 35. In exhaust gas passage 31, a pressure sensor 51 is disposed between NOx trap 32 and DPF 33, for sensing an exhaust gas pressure Pexh of exhaust gas. Downstream from DPF 33 are disposed an oxygen sensor 52 and a temperature sensor 53. Oxygen sensor 52 senses an excess air ratio A. Temperature sensor 53 senses an exhaust gas temperature. The detected exhaust gas temperature is used for estimating a bed temperature of NOx trap 32 (NOx trap temperature) Tnox and a bed temperature of DPF 33 (DPF temperature) Tdpf. NOx trap temperature Tnox and DPF temperature Tdpf may be sensed directly by temperature sensors disposed at NOx trap 32 and DPF 33. The engine system includes an air flow meter 54, a crank angle sensor 55, an accelerator opening sensor 56, and a temperature sensor 57. The sensors as a condition sensor collects information needed to determine the operating condition of the engine, and outputs signals to a controller such as an electric control unit (ECU) 41. ECU 41 determines or calculates an intake air quantity Qac, an engine speed Ne, an accelerator opening APO, and a fuel temperature Tfuel, based on the signals from air flow meter 54, crank angle sensor 55, and accelerator opening sensor 56, respectively. ECU 41 executes a routine including the above-discussed calculation, and issues commands to a combustion controlling actuator including fuel injector 21, vane actuator 122, throttle actuator 151, and EGR actuator 351.

Figure 2:
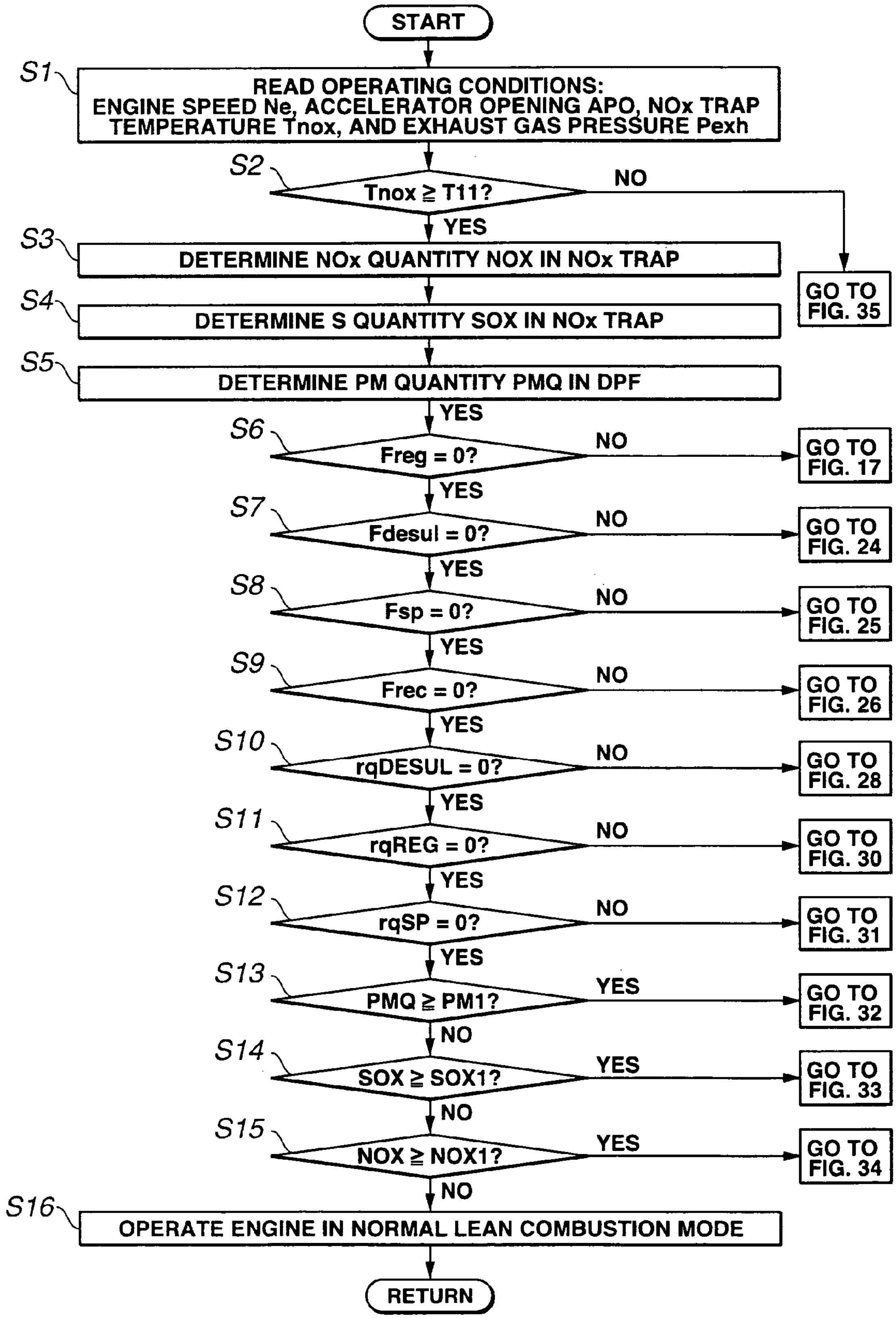
FIG. 2 is a flow chart depicting a process of determining an operating mode of the engine in accordance with the embodiment of the present invention.

The following describes operations of ECU 41. PM regeneration indicates an operation to release PM from DPF 33. NOx regeneration indicates an operation to release NOx from NOx trap 32. S regeneration indicates an operation to release sulfur content from NOx trap 32. Referring now to FIG. 2, there is shown a flow chart depicting a process of determining an operating mode of the engine in accordance with the embodiment of the present invention. ECU 41 switches the combustion mode in accordance with the operating mode.

At step S1, ECU 41 reads engine speed Ne, accelerator opening APO, NOx trap temperature Tnox, and exhaust gas pressure Pexh.

At step S2, a check is made to determine whether NOx trap 32 is activated or not. Actually, it is determined whether or not NOx trap temperature Tnox is higher than or equal to a predetermined threshold temperature T11. When the answer to step S2 is YES, the routine proceeds to step S3. On the other hand, when the answer to step S2 is NO, the routine proceeds to a routine shown in FIG. 35. Temperature T11 is an activation temperature at which NOx trap 32 is activated.

At step S3, ECU 41 determines a trapped quantity of NOx (NOx quantity NOX). NOx quantity NOX, which is a quantity of NOx trapped in NOx trap 32, is calculated based on engine speed Ne from the following equation (1).

$$NOX=NOX_{n-1}+Ne\cdot\Delta t \quad (1)$$

where a variable including a numerical subscript n−1 indicates a value calculated in the preceding execution, Δt indicates a time interval of a series of execution of the routine. Alternatively, NOx quantity NOX may be estimated by adding up a predetermined quantity for each predetermined distance traveled.

At step S4, ECU 41 determines a trapped quantity of S (S quantity SOX). S quantity SOX, which is a quantity of NOx trapped in NOx trap 32, is calculated based on engine speed Ne from the following equation (2), as in the case of NOx quantity NOX.

$$SOX=SOX_{n-1}+Ne\cdot\Delta t \quad (2)$$

At step S5, ECU 41 determines a particulate matter (PM) accumulation quantity PMQ. PM quantity PMQ, which is a quantity of PM accumulated in DPF 33, is estimated based on exhaust gas pressure Pexh upstream to DPF 33. Alternatively, PM quantity PMQ may be estimated by calculating and adding up a PM quantity per unit time, based on engine speed Ne and/or a traveled distance.

At step S6, a check is made to determine whether or not a PM regeneration flag Freg is equal to zero. PM regeneration flag Freg is reset to zero during the normal operating mode. When the answer to step S6 is YES, the routine proceeds to step S7. On the other hand, when the answer to step S6 is NO, the routine proceeds to a routine shown in FIG. 17.

Figure 24:
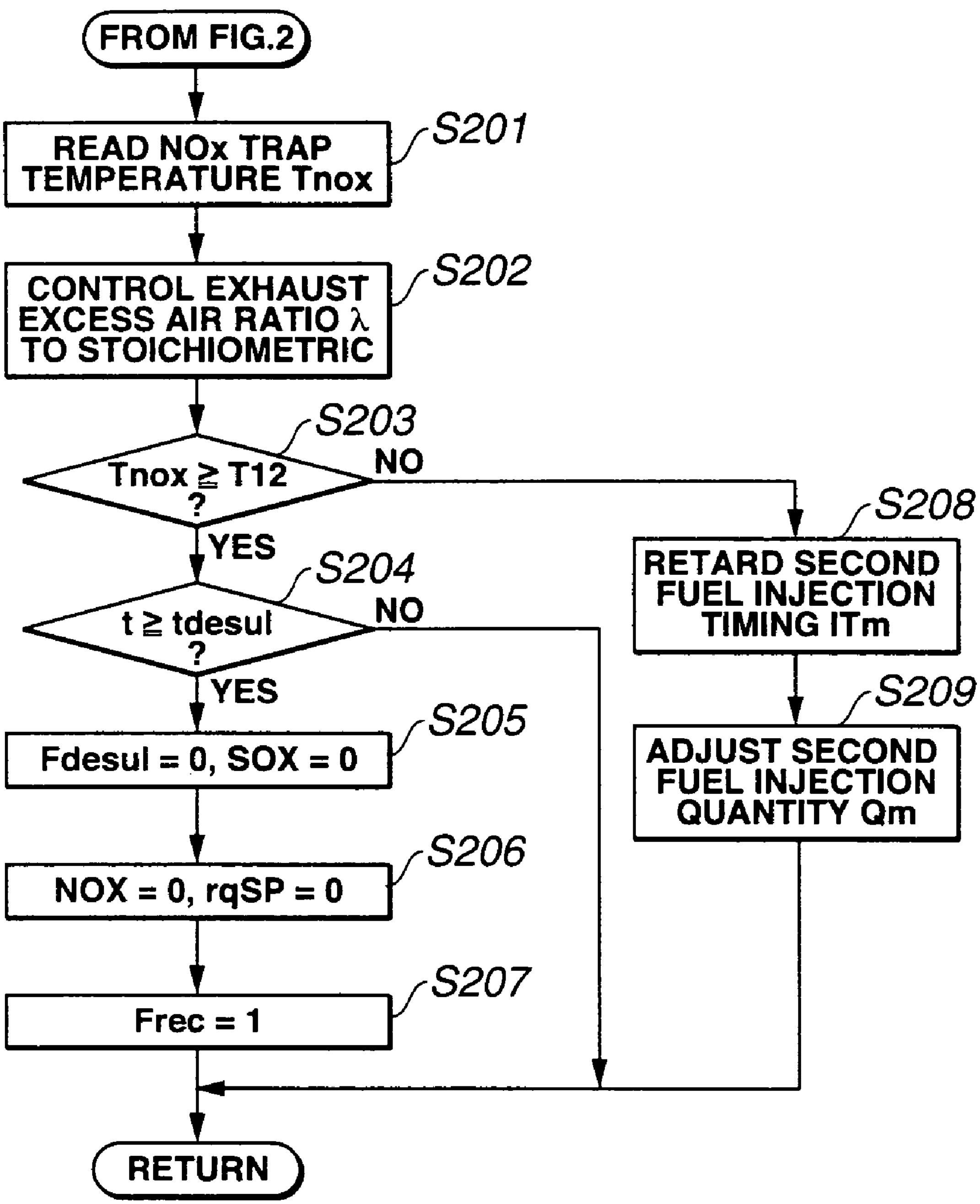
FIG. 24 is a flow chart depicting a process of S regeneration in accordance with the embodiment of the present invention.

At step S7, a check is made to determine whether or not an S regeneration flag Fdesul is equal to zero. S regeneration flag Fdesul is reset to zero during the normal operating mode. When the answer to step S7 is YES, the routine proceeds to step S8. On the other hand, when the answer to step S7 is NO, the routine proceeds to a routine shown in FIG. 24.

At step S8, a check is made to determine whether or not a NOx regeneration flag Fsp is equal to zero. NOx regeneration flag Fsp is reset to zero during the normal operating mode. When the answer to step S8 is YES, the routine proceeds to step S9. On the other hand, when the answer to step S8 is NO, the routine proceeds to a routine shown in FIG. 25.

At step S9, a check is made to determine whether or not a breakdown avoidance flag Frec is equal to zero. Breakdown avoidance flag Frec is reset to zero during the normal operating mode, and temporarily set to 1 just after PM regeneration or S regeneration is discontinued. When the answer to step S9 is YES, the routine proceeds to step S10. On the other hand, when the answer to step S9 is NO, the routine proceeds to a routine shown in FIG. 26.

At step S10, a check is made to determine whether or not an S regeneration request flag rqDESUL is equal to zero. S regeneration request flag rqDESUL is reset to zero during the normal operating mode, and set to 1 when S regeneration is desired in accordance with S quantity SOX. When the answer to step S10 is YES, the routine proceeds to step S11. On the other hand, when the answer to step S10 is NO, the routine proceeds to a routine shown in FIG. 28.

At step S11, a check is made to determine whether or not a PM regeneration request flag rqREG is equal to zero. PM regeneration request flag rqREG is reset to zero during the normal operating mode, and set to 1 when PM regeneration is desired in accordance with PM quantity PMQ. When the answer to step S11 is YES, the routine proceeds to step S12. On the other hand, when the answer to step S11 is NO, the routine proceeds to a routine shown in FIG. 30.

At step S12, a check is made to determine whether or not a PM regeneration request flag rqREG is equal to zero. PM regeneration request flag rqREG is reset to zero during the normal operating mode, and set to 1 when NOx regeneration is desired in accordance with NOx quantity NOX. When the answer to step S12 is YES, the routine proceeds to step S13. On the other hand, when the answer to step S12 is NO, the routine proceeds to a routine shown in FIG. 31. At step S701 in FIG. 31, NOx regeneration flag Fsp is set to 1.

Figure 3:
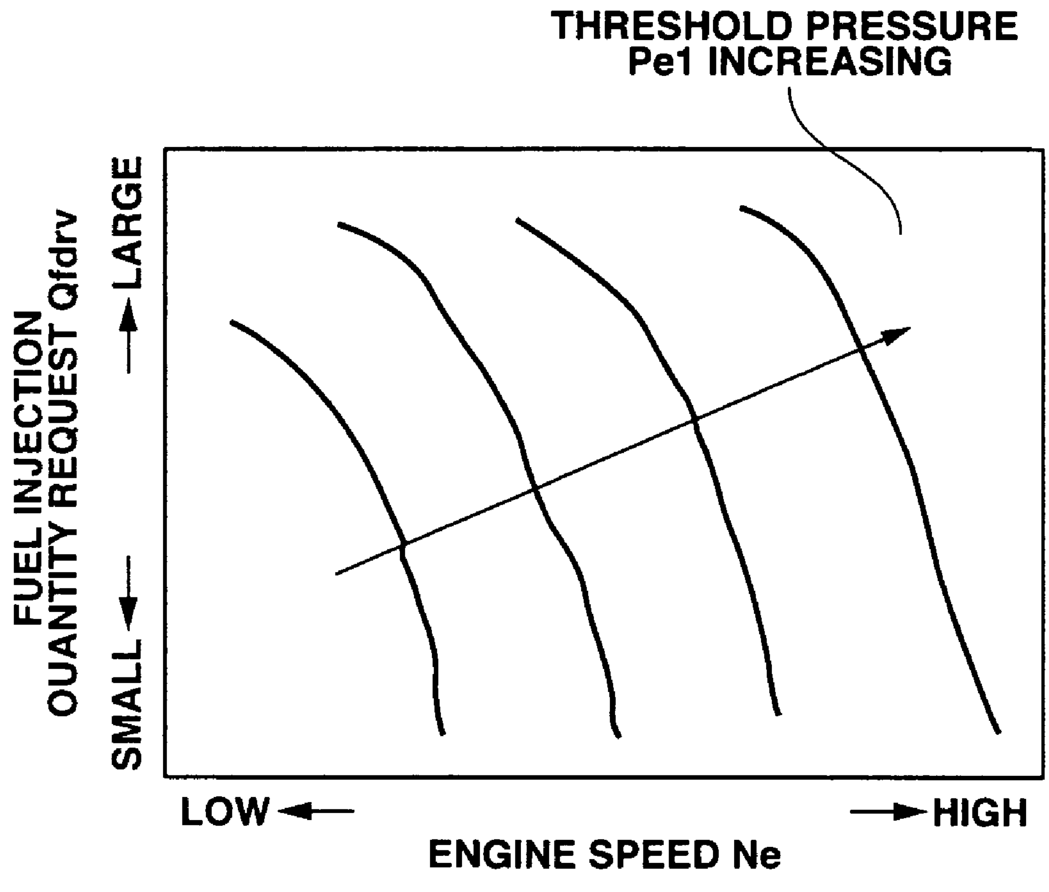
FIG. 3 is a representation of a map of a relationship among a threshold pressure Pe1 for determining the start of PM regeneration, an engine speed Ne, and a fuel injection quantity request Qfdrv.
Figure 32:
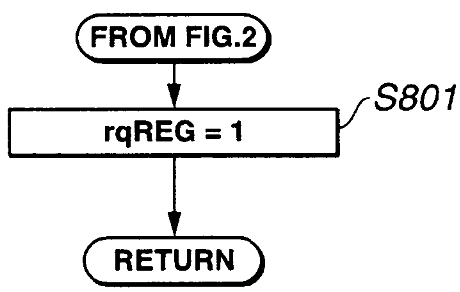
FIG. 32 is a flow chart depicting a process of setting a PM regeneration request flag rqREG in accordance with the embodiment of the present invention.

At step S13, a check is made to determine whether or not PM regeneration is desired. That is, it is determined whether or not PM quantity PMQ is larger than or equal to a predetermined threshold quantity PM1. An exhaust gas pressure Pe1 corresponding to threshold quantity PM1 is determined in accordance with the operating condition. Actually, exhaust gas pressure Pexh detected by pressure sensor 51 is compared with pressure Pe1. Pressure Pe1 is calculated or retrieved from a map as shown in FIG. 3 as a function of engine speed Ne and fuel injection quantity request Qfdrv. Threshold pressure Pe1 increases with increasing engine speed Ne and increasing fuel injection quantity request Qfdrv. Fuel injection quantity request Qfdrv indicates a fuel quantity supplied with main fuel injection in the normal combustion mode (main fuel injection quantity) Qmain, and indicates a fuel quantity supplied with second fuel injection in a split retard combustion mode (second fuel injection quantity) Qm, as below discussed. When the answer to step S13 is YES, the routine proceeds to a routine shown in FIG. 32. At step S801 in FIG. 32, PM regeneration request flag rqREG is set to 1. On the other hand, when the answer to step S13 is NO, the routine proceeds to step S14. Alternatively, the traveled distance after the last process of PM regeneration may be calculated for the determination of PM regeneration request flag rqREG. In this case, PM regeneration request flag rqREG is set to 1 when the traveled distance after the last process of PM regeneration reaches a predetermined distance. This prevents potential redundant execution of PM regeneration.

Figure 33:
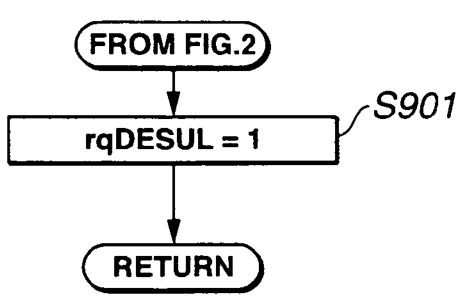
FIG. 33 is a flow chart depicting a process of setting an S regeneration request flag rqDESUL in accordance with the embodiment of the present invention.

At step S14, a check is made to determine whether or not S regeneration is desired. That is, it is determined whether or not S quantity SOX is larger than or equal to a predetermined threshold quantity SOX1. When the answer to step S14 is YES, the routine proceeds to a routine shown in FIG. 33. At step S901 in FIG. 33, S regeneration request flag rqDESUL is set to 1. On the other hand, when the answer to step S14 is NO, the routine proceeds to step S15.

Figure 34:
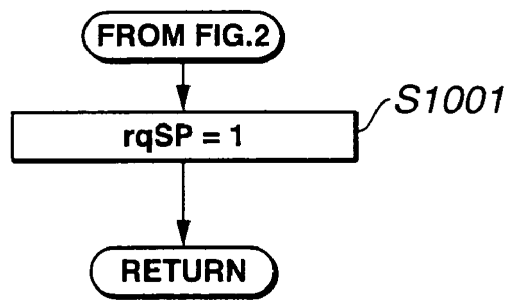
FIG. 34 is a flow chart depicting a process of setting a NOx regeneration request flag rqSP in accordance with the embodiment of the present invention.

At step S15, a check is made to determine whether or not NOx regeneration is desired. That is, it is determined whether or not NOx quantity NOX is larger than or equal to a predetermined threshold quantity NOX1. When the answer to step S15 is YES, the routine proceeds to a routine shown in FIG. 34. At step S1001 in FIG. 34, NOx regeneration request flag rqSP is set to 1. On the other hand, when the answer to step S15 is NO, the routine proceeds to step S16.

Regeneration request flags reREG, reDESUL, and reSP are each reset to zero, when engine 1 is turned on.

At step S16, ECU 41 operates engine 1 in the normal lean combustion mode (normal combustion mode). On the other hand, ECU 41 shifts the combustion mode to the split retard combustion mode, in case the routine proceeding from step S2 to the routine in FIG. 35 to activate NOx trap 32, in case the routine proceeding from step S6 to the routine in FIG. 17 to perform PM regeneration, in case the routine proceeding from step S7 to the routine in FIG. 24 to perform S regeneration, and in case the routine proceeding from step S8 to the routine in FIG. 25 to perform NOx regeneration.

Figures 4A, 4B:
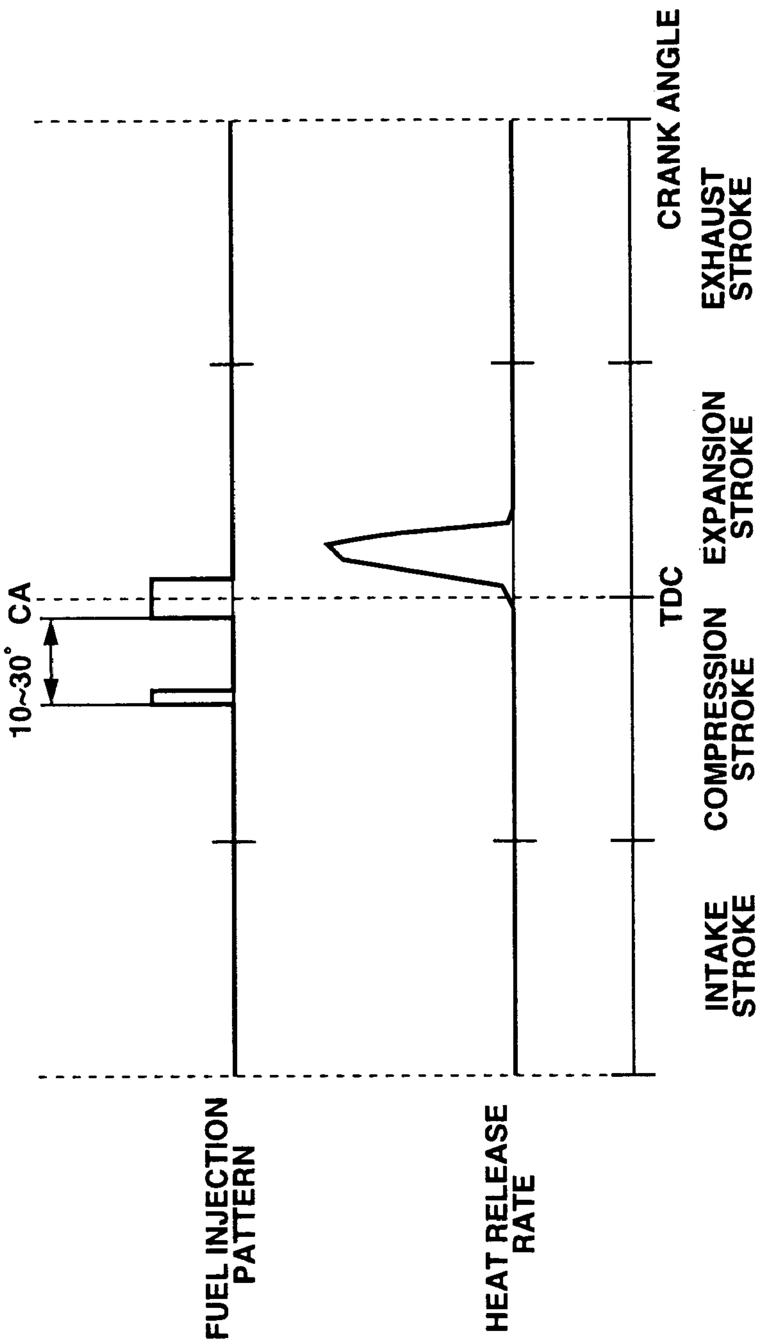
FIG. 4A is a time chart of a fuel injection quantity in a normal combustion mode.
FIG. 4B is a time chart of a heat release rate in accordance with the fuel injection shown in FIG. 4A.
Figures 5A, 5B:
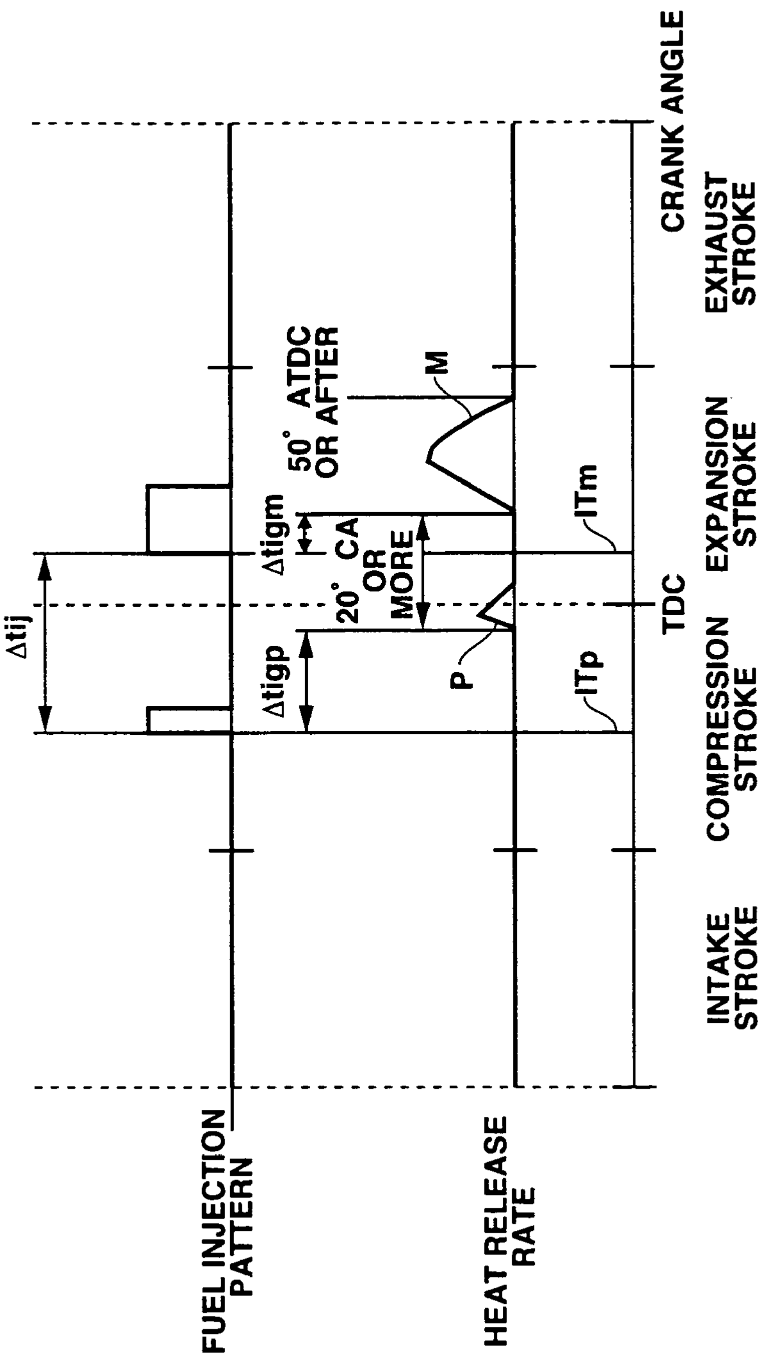
FIG. 5A is a time chart of the fuel injection quantity in a split retard combustion mode.
FIG. 5B is a time chart of the heat release rate in accordance with the fuel injection shown in FIG. 5A.

The following describes the combustion modes in detail. Referring now to FIGS. 4A to 5B, there are shown a fuel injection pattern and a heat release rate in each combustion mode. FIGS. 4A and 4B show the normal combustion mode. FIGS. 5A and 5B show the split retard combustion mode. In the normal combustion mode, a pilot fuel injection and a main fuel injection are performed under a regular operating condition. The pilot fuel injection is executed between 40–10° CA before top dead center (BTDC). The fuel quantity per stroke is set to 1–3 $mm^3$. Following the pilot fuel injection, the main fuel injection is executed between 10° BTDC and 20° after top dead center (ATDC). The time interval between timings (start timings) of the pilot fuel injection and the main fuel injection is set between 10–30° CA.

As shown in FIGS. 5A and 5B, two fuel injections are employed in the split retard combustion mode. In the split retard combustion mode, a first fuel injection is executed in compression stroke, and a second fuel injection is executed in expansion stroke. The first fuel injection produces preliminary combustion at or near TDC to release heat quantity P, so as to raise an incylinder temperature at TDC of compression stroke (compression end temperature). The fuel quantity by the first fuel injection (first fuel injection quantity) Qp is determined so as to produce a recognizable heat release quantity. First fuel injection quantity Qp desired varies in accordance with the operating condition of the engine system. After an end of the preliminary combustion, the second fuel injection is executed so that main combustion produces engine output torque. The main combustion releases heat quantity M. A time interval Δtij between the start timing of first fuel injection (first fuel injection timing) ITp and the start timing of second fuel injection (second fuel injection timing) ITm is determined based on engine speed Ne, so that a time interval between the start timing of preliminary combustion and the start timing of main combustion is longer than or equal to 20° CA. Since the main combustion takes place in expansion stroke, the duration of the burning process of the main combustion is extended so that the end timing of the burning process is after 50° ATDC. The preliminary combustion or the heat release of the preliminary combustion starts an ignition lag Δtigp after the start of the first fuel injection. The main combustion or the heat release of the main combustion starts an ignition lag Δtigm after the start of the second fuel injection.

Figure 6A:
FIG. 6A is a representation of a table of a relationship between an exhaust gas temperature and a second fuel injection timing ITm in the split retard combustion mode.
Figure 6B:
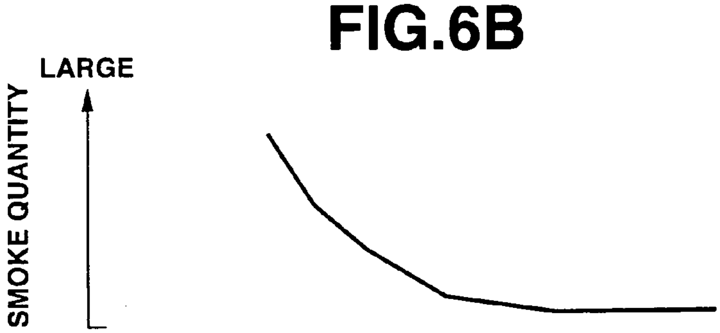
FIG. 6B is a representation of a table of a relationship between a smoke quantity and second fuel injection timing ITm in the split retard combustion mode.
Figure 6C:
FIG. 6C is a representation of a table of a relationship between a CO quantity and second fuel injection timing ITm in the split retard combustion mode.
Figure 6D:
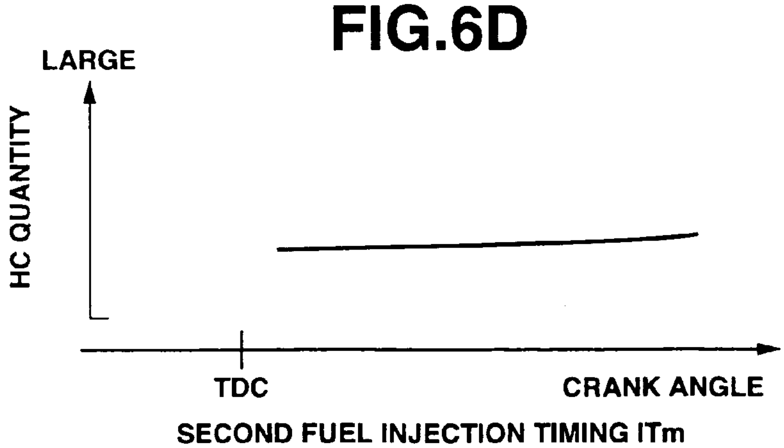
FIG. 6D is a representation of a table of a relationship between a HC quantity and second fuel injection timing ITm in the split retard combustion mode.

Referring now to FIGS. 6A through 6D, there are shown effects produced by the split retard combustion, with reference to second fuel injection timing ITm. Excess air ratio λ is held constant. In the split retard combustion mode, the exhaust gas temperature increases with retarding second fuel injection timing ITm, as shown in FIG. 6A. The time interval Δtij between first fuel injection timing ITp and second fuel injection timing ITm is adjusted to ensure the time interval between the end timing of the preliminary combustion and the start timing of the main combustion. Performing the second fuel injection after the end of the preliminary combustion ensures a time period longer than ignition lag Δtigm for the time interval between the end timing of the preliminary combustion and the start timing of the main combustion. This increases the proportion of premixed combustion in the main combustion. During regenerating the exhaust purifier, for example, during PM regeneration for DPF 33, the exhaust gas temperature is raised to a high temperature desired for activating NOx trap 32, and excess air ratio λ is decreased without increasing exhaust smoke. As shown in FIGS. 6A and 6B, the exhaust gas temperature rises and the quantity of exhaust smoke decreases with retarding second fuel injection timing ITm. In general, the exhaust air-fuel ratio is reduced by decreasing the intake air quantity, which tends to produce an unstable process of combustion. However, in the shown embodiment, the preliminary combustion increases compression end temperature to allow a stable process of the main combustion. In the split retard combustion mode, the HC quantity remains below a low level, little depending on second fuel injection timing ITm.

Figures 7A, 7B:
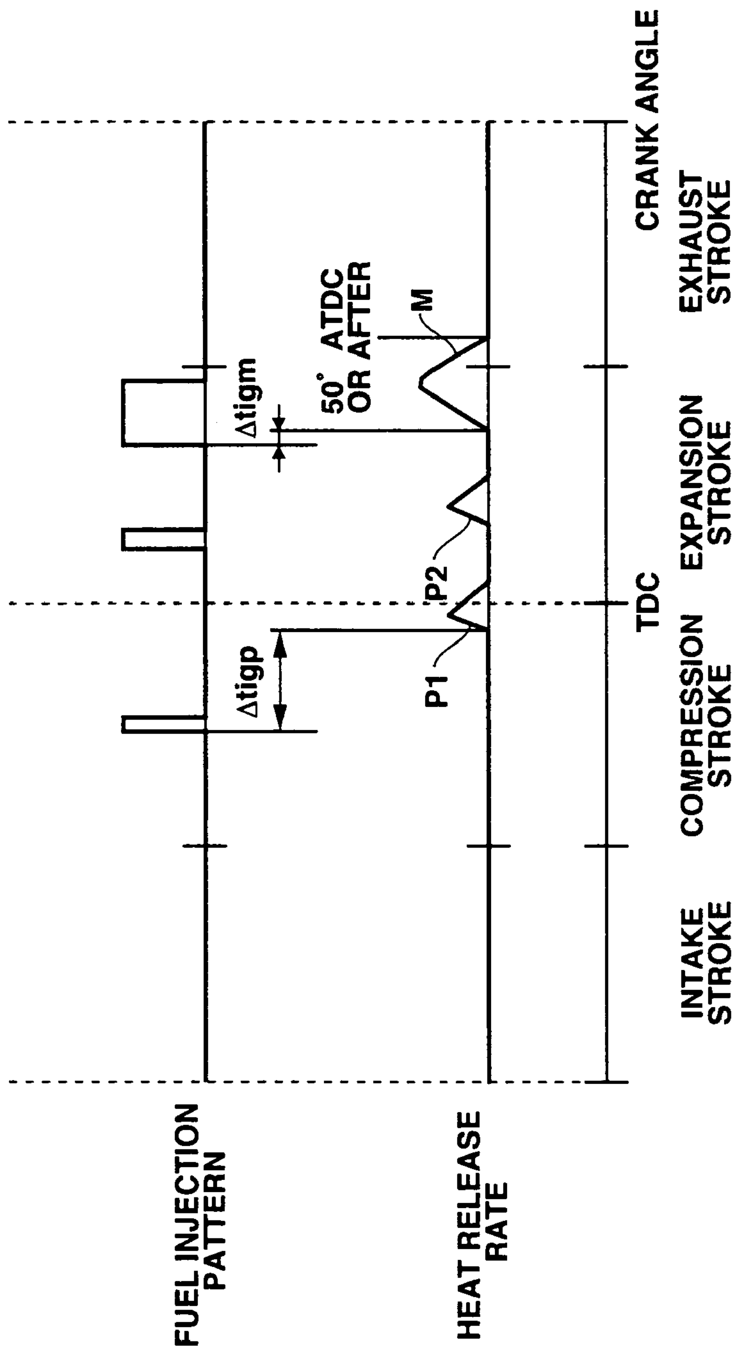
FIG. 7A is a time chart of the fuel injection quantity in the split retard combustion mode under a low load condition.
FIG. 7B is a time chart of the heat release rate in accordance with the fuel injection shown in FIG. 7A.

Under low load conditions, the exhaust gas temperature is inherently low. Accordingly, it is necessary to raise the exhaust gas temperature greatly for obtaining a target temperature for PM regeneration or S regeneration. For raising the exhaust gas temperature, a main combustion timing (start timing of the main combustion) needs to be retarded more than in the normal split retard combustion mode. However, there is a possibility that a single process of the preliminary combustion is not enough to maintain the incylinder temperature above a desirable level for the main combustion. In such a case, in the split retard combustion mode, the preliminary combustion employs multiple burning processes, as shown in FIGS. 7A and 7B. The incylinder temperature is raised by the first process of preliminary combustion, and is maintained by the following process. Heat release P1, P2, and M are separated with no lap, to regulate the exhaust gas temperature to a target temperature without increasing exhaust smoke.

Figure 8:
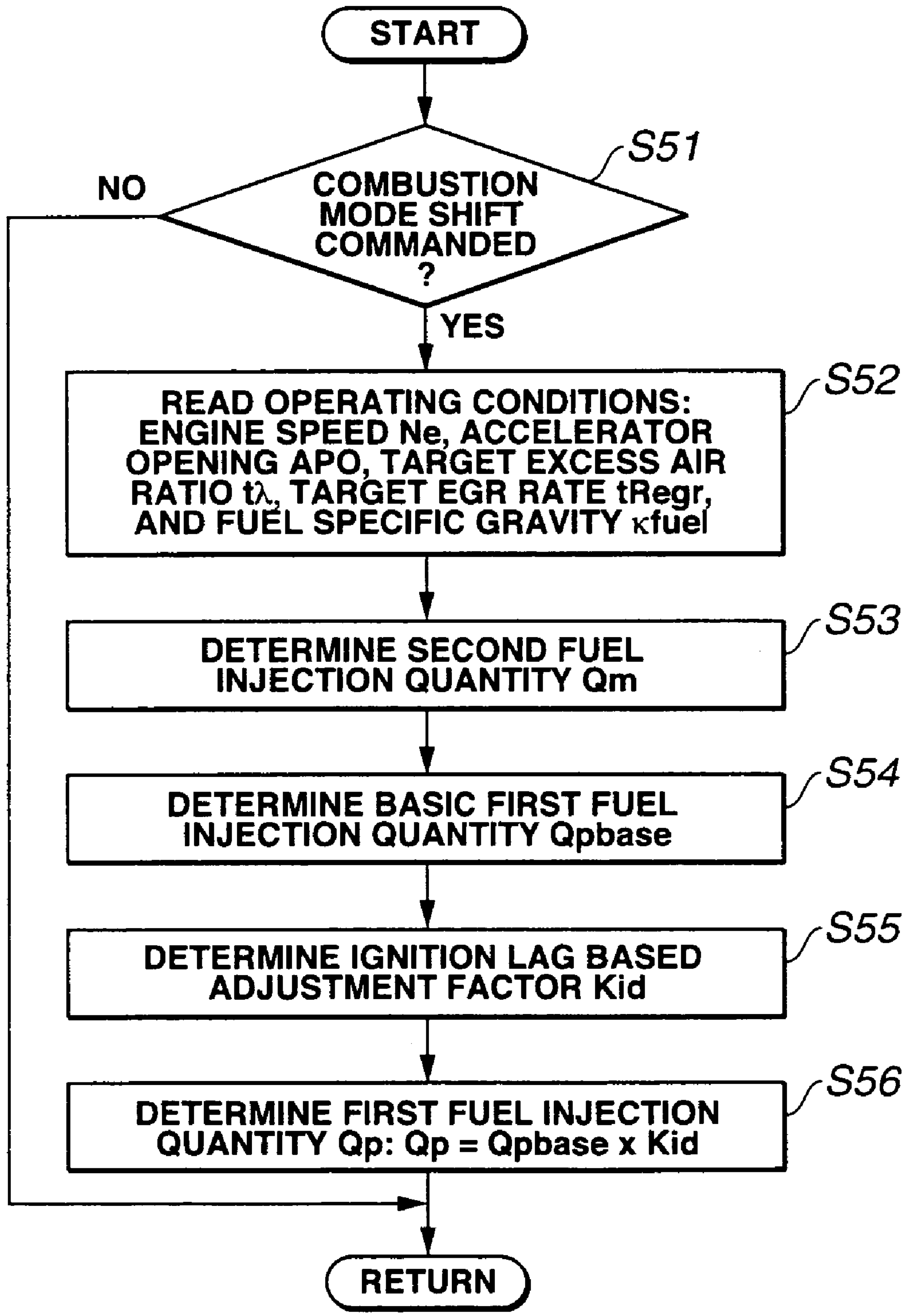
FIG. 8 is a flow chart depicting a process of determining fuel injection quantities for the split retard combustion mode in accordance with the embodiment of the present invention.

Referring now to FIG. 8, there is shown a flow chart depicting a process of determining fuel injection quantities for the split retard combustion mode. This routine is executed at the occasion of executing the split retard combustion. Actually, first fuel injection quantity Qp and fuel quantity by second fuel injection (second fuel injection quantity) Qm are determined.

At step S51, a check is made to determine whether or not combustion mode shift is commanded. ECU 41 issues the command of shifting the combustion mode in cases of activating NOx trap 32, PM regeneration, S regeneration, and NOx regeneration. When the answer to step S51 is YES, the routine proceeds to step S52. On the other hand, when the answer to step S51 is NO, the routine returns.

At step S52, ECU 41 reads engine speed Ne, accelerator opening APO, target excess air ratio tλ, a target EGR rate tRegr, and a fuel specific gravity κfuel.

Target excess air ratio tλ is set to a value suitable for each of PM regeneration, S regeneration, NOx regeneration, and rapid activation of NOx trap.

Figure 9:
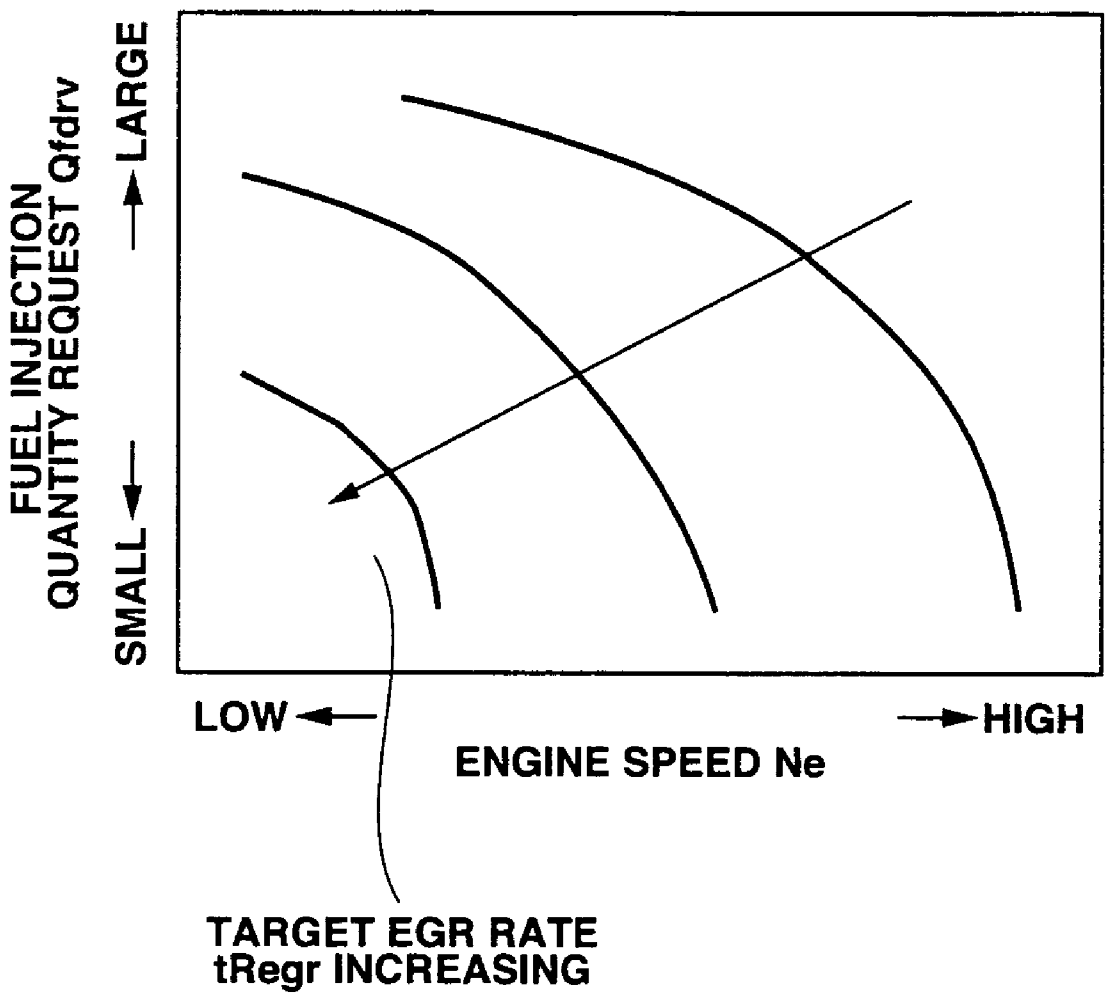
FIG. 9 is a representation of a map of a relationship among a target EGR rate tRegr, engine speed Ne, and fuel injection quantity request Qfdrv.

Target EGR rate tRegr is determined through an EGR control routine. Actually, target EGR rate tRegr is calculated or retrieved from a map as shown in FIG. 9 as a function of engine speed Ne and fuel injection quantity request Qfdrv. Target EGR rate tRegr increases with decreasing engine speed Ne and decreasing fuel injection quantity request Qfdrv. In the EGR control routine, ECU 41 determines a target EGR valve opening tAegr. First, a target EGR quantity tQegr is calculated as a function of target EGR rate tRegr and intake air quantity Qac, using the following equation (3).

$$tQegr=\{tRegr/(1-tRegr)\}\times tQac \quad (3)$$

Target EGR valve opening tAegr is determined in accordance with target EGR quantity tQegr. ECU 41 controls EGR actuator 351 to regulate EGR valve 35 to target EGR valve opening tAegr.

Figure 10:
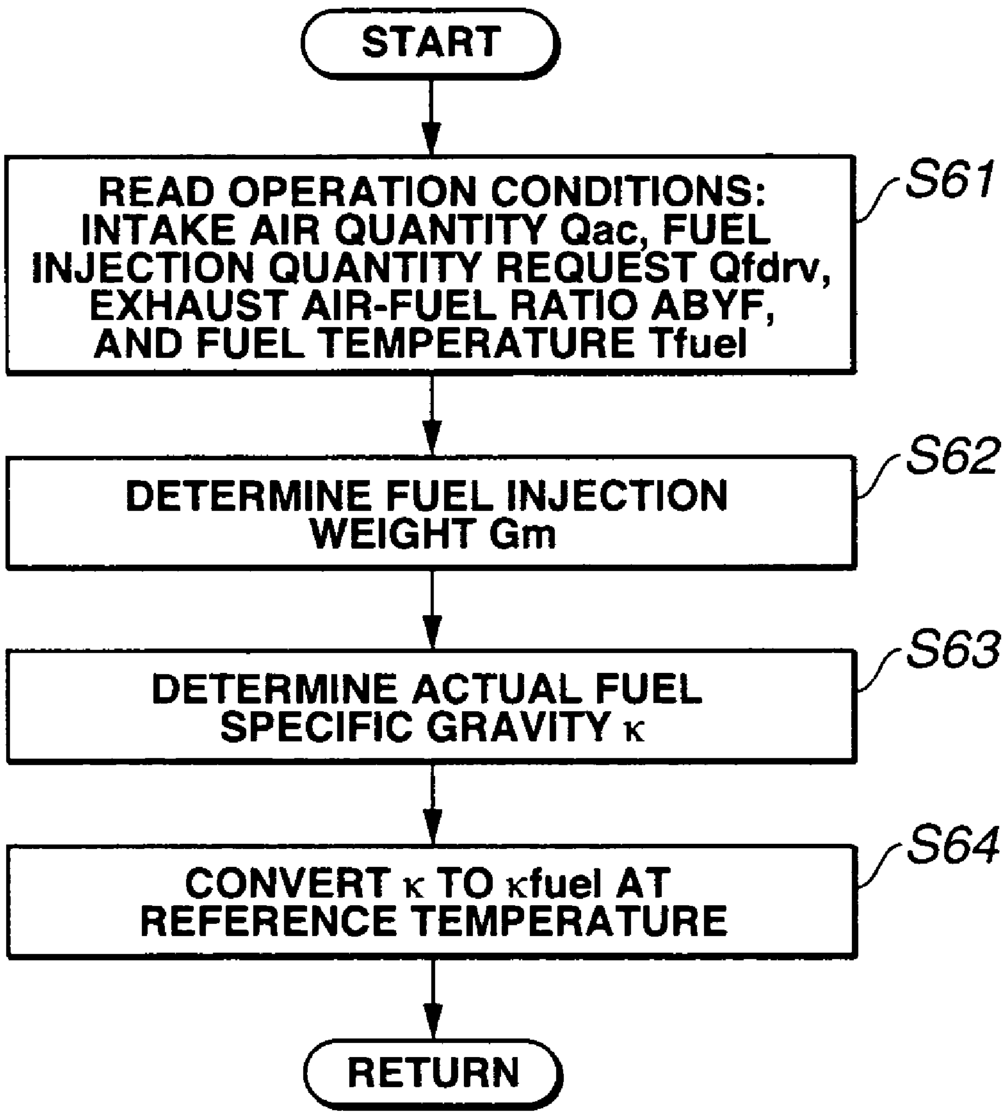
FIG. 10 is a flow chart depicting a process of determining a fuel specific gravity κfuel in accordance with the embodiment of the present invention.

Fuel specific gravity κfuel is determined through a routine of detecting a fuel property as shown in FIG. 10. This routine is executed every time a fuel tank is charged with fuel.

At step S61 in FIG. 10, ECU 41 reads intake air quantity Qac, fuel injection quantity request Qfdrv, an exhaust air-fuel ratio ABYF, and fuel temperature Tfuel. Next, the routine proceeds to step S62.

At step S62, ECU 41 determines a fuel injection weight Gm. Fuel injection weight Gm is produced by dividing intake air quantity Qac by exhaust air-fuel ratio ABYF (Gm=Qac/ABYF). Next, the routine proceeds to step S63.

At step S63, ECU 41 determines a fuel specific gravity κ. Fuel specific gravity κ is produced by dividing fuel injection weight Gm by fuel injection quantity request Qfdrv (κ=Gm/Qfdrv). Next, the routine proceeds to step S64.

At step S64, fuel specific gravity κ is converted to a fuel specific gravity at a reference temperature such as 20° C. The calculated fuel specific gravity is stored in a fuel specific gravity κfuel. Next, the routine returns.

Figure 11:
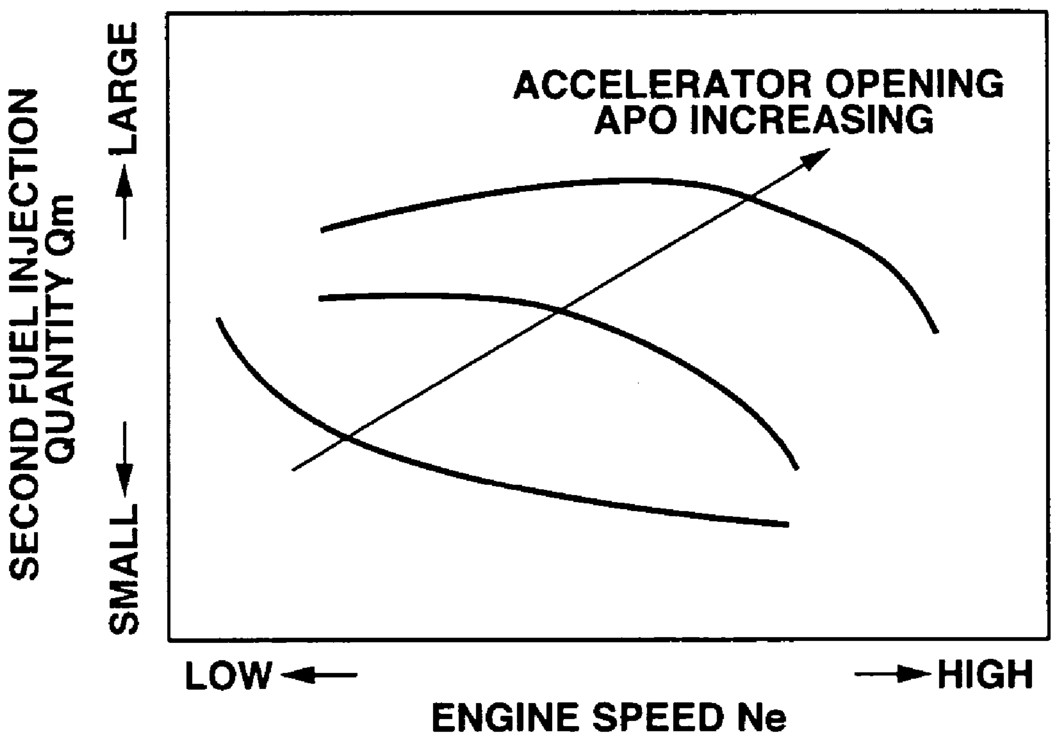
FIG. 11 is a representation of a map of a relationship among a second fuel injection quantity Qm, engine speed Ne, and accelerator opening APO.

Referring back to FIG. 8, at step S53, following step S52, ECU 41 determines second fuel injection quantity Qm. Second fuel injection quantity Qm is calculated or retrieved from a map as shown in FIG. 11 as a function of accelerator opening APO and engine speed Ne. Second fuel injection quantity Qm increases with increasing accelerator opening APO and with engine speed Ne held constant. Next, the routine proceeds to step S54.

Figure 12:
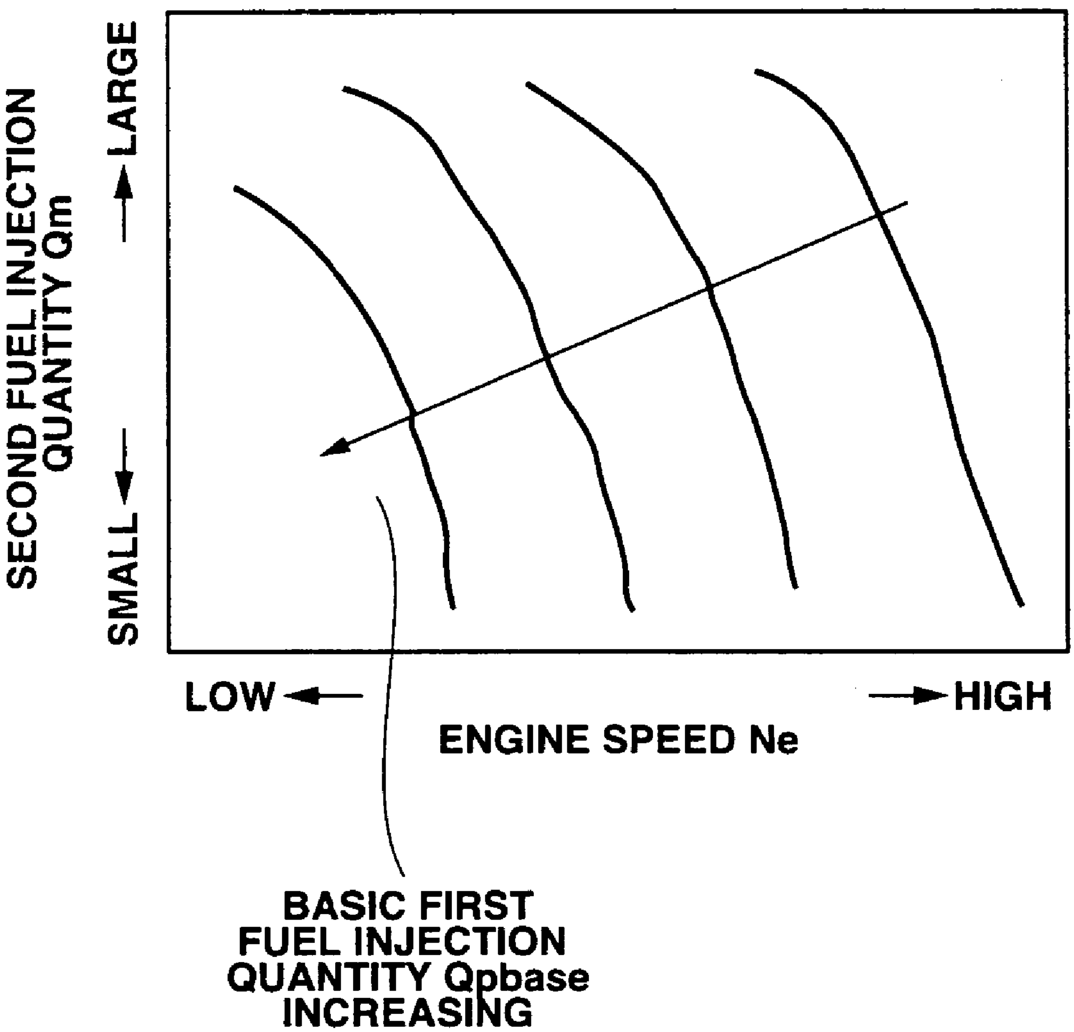
FIG. 12 is a representation of a map of a relationship among a basic first fuel injection quantity Qpbase, engine speed Ne, and second fuel injection quantity Qm.

At step S54, ECU 41 determines a basic first fuel injection quantity Qpbase. Basic first fuel injection quantity Qpbase is calculated or retrieved from a map as shown in FIG. 12 as a function of engine speed Ne and second fuel injection quantity Qm. Basic first fuel injection quantity Qpbase increases with decreasing engine speed Ne and decreasing second fuel injection quantity Qm. Next, the routine proceeds to step S55.

At step S55, ECU 41 determines an ignition lag based adjustment factor Kid. Ignition lag based adjustment factor Kid is determined based on a factor for an increase in ignition lag of the preliminary combustion. The factor in correlation with the ignition lag includes target excess air ratio tλ, target EGR rate tRegr, engine speed Ne, and fuel specific gravity κfuel. Accordingly, ignition lag based adjustment factors Kid1 through Kid4 are calculated in accordance with the elements of the factor for ignition lag. Ignition lag based adjustment factor Kid is produced by multiplying ignition lag based adjustment factors Kid1 through Kid4 (Kid=Kid1·Kid2·Kid3·Kid4). As discussed below, ignition lag based adjustment factor Kid is used to adjust first fuel injection quantity Qp.

Figure 13:
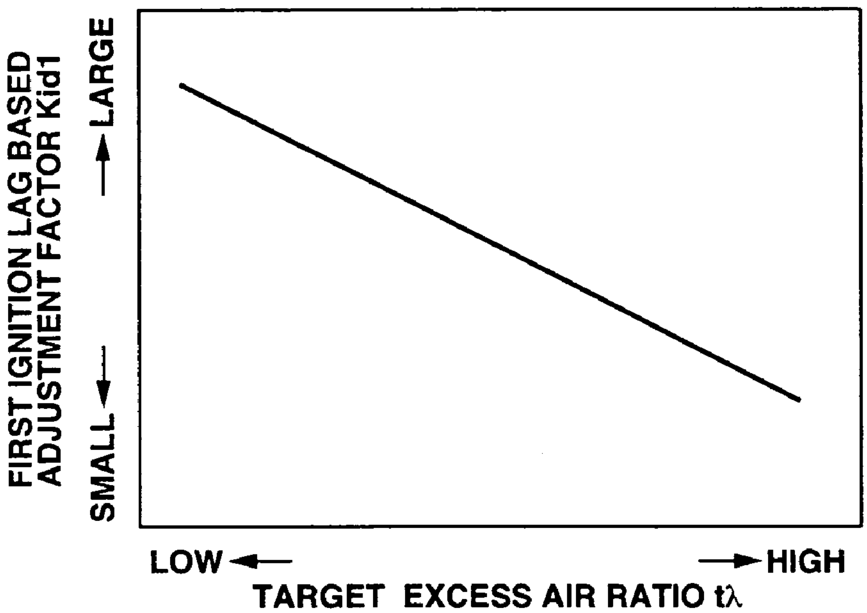
FIG. 13 is a representation of a table of a relationship between target excess air ratio tλ and a first ignition lag based adjustment factor Kid1.

First ignition lag based adjustment factor Kid1 is calculated or retrieved from a table as shown in FIG. 13 as a function of target excess air ratio tλ. First ignition lag based adjustment factor Kid1 increases with decreasing target excess air ratio tλ. In the combustion control of the shown embodiment, the intake air quantity is decreased to decrease the exhaust air-fuel ratio. A decrease in the exhaust air-fuel ratio results in a decrease in the compression end temperature. A decrease in the compression end temperature tends to increase the ignition lag. Accordingly, first ignition lag based adjustment factor Kid1 increases to increase first fuel injection quantity Qp, with decreasing compression end temperature. In the shown embodiment, target excess air ratio tλ is selected as a variable in correlation with the compression end temperature. Alternatively, another variable such as an incylinder pressure at a specific crank angle may be selected as a factor for the adjustment.

Figure 14:
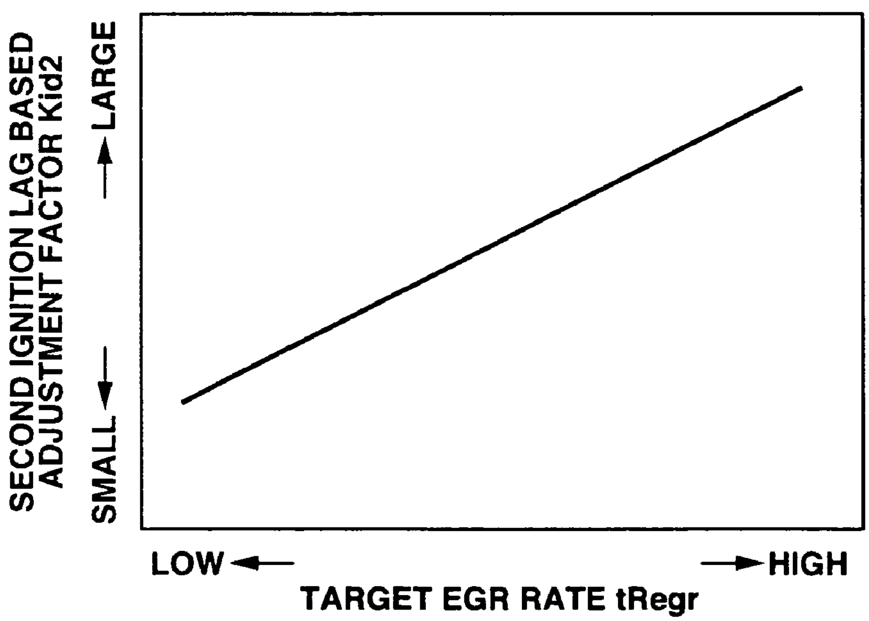
FIG. 14 is a representation of a table of a relationship between target EGR rate tRegr and a second ignition lag based adjustment factor Kid2.

Second ignition lag based adjustment factor Kid2 is calculated or retrieved from a table as shown in FIG. 14 as a function of target EGR rate tRegr. Second ignition lag based adjustment factor Kid2 increases with increasing target EGR rate tRegr. An increase in target EGR rate tRegr results in a decrease in the concentration of oxygen. A decrease in the concentration of oxygen tends to increase the ignition lag. Accordingly, second ignition lag based adjustment factor Kid2 increases to increase first fuel injection quantity Qp, with decreasing concentration of oxygen.

Figure 15:
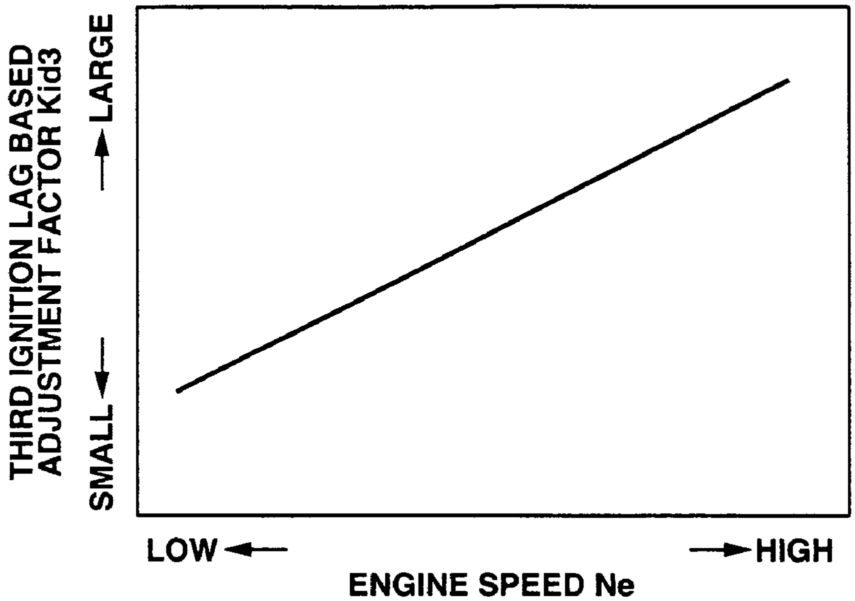
FIG. 15 is a representation of a table of a relationship between engine speed Ne and a third ignition lag based adjustment factor Kid3.

Third ignition lag based adjustment factor Kid3 is calculated or retrieved from a table as shown in FIG. 15 as a function of engine speed Ne. Third ignition lag based adjustment factor Kid3 increases with increasing engine speed Ne. An increase in engine speed Ne results in an increase in the ignition lag in crank angle. Accordingly, third ignition lag based adjustment factor Kid3 increases to increase first fuel injection quantity Qp, with increasing ignition lag.

Figure 16:
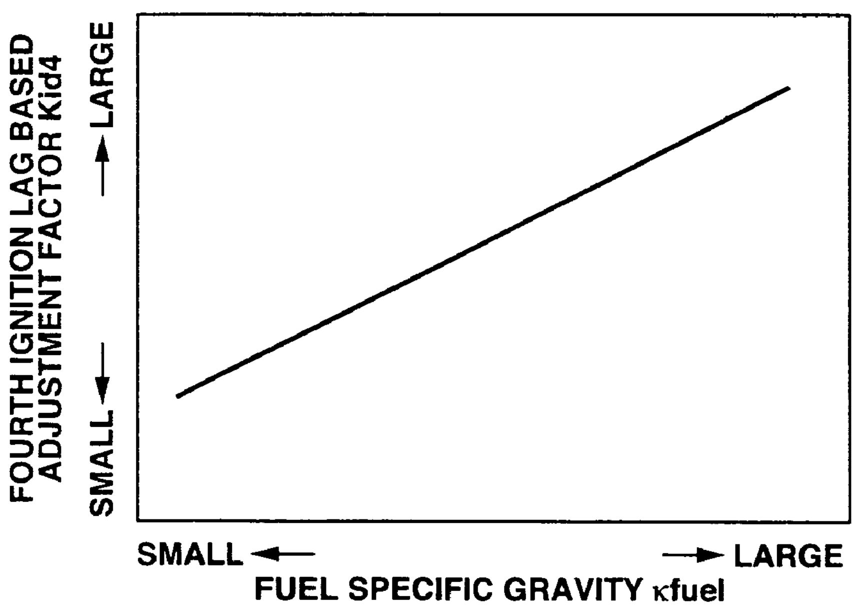
FIG. 16 is a representation of a table of a relationship between fuel specific gravity κfuel and a fourth ignition lag based adjustment factor Kid4.

Fourth ignition lag based adjustment factor Kid4 is calculated or retrieved from a table as shown in FIG. 16 as a function of fuel specific gravity κfuel. Fourth ignition lag based adjustment factor Kid4 increases with increasing fuel specific gravity κfuel. An increase in fuel specific gravity κfuel (or a decrease in the cetane number) results in a decrease in the ignition quality. A decrease in the ignition quality tends to increase the ignition lag. Accordingly, fourth ignition lag based adjustment factor Kid4 increases to increase first fuel injection quantity Qp, with decreasing ignition quality.

At step S56, following step S55, first fuel injection quantity Qp is determined. First fuel injection quantity Qp is produced by multiplying basic first fuel injection quantity Qpbase by ignition lag based adjustment factor Kid (Qp=Qpbase·Kid). This adjustment corrects the ignition lag of the fuel injected by the first fuel injection.

Figure 17:
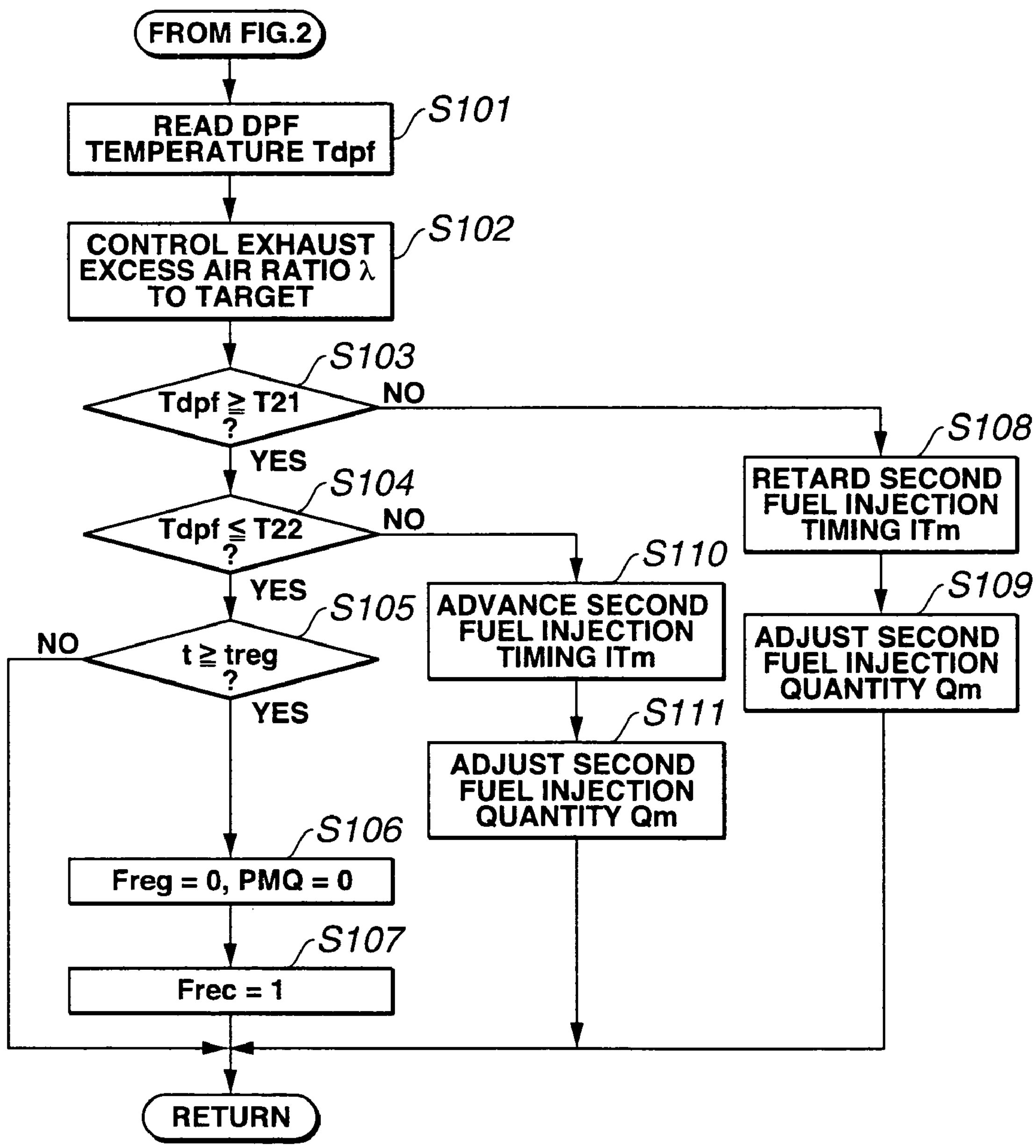
FIG. 17 is a flow chart depicting a process of controlling the exhaust gas temperature in the process of PM regeneration shown in FIG. 11.

Referring now to FIG. 17, there is shown a flow chart of a process of PM regeneration. This routine is executed when the answer to step S6 in FIG. 2 is NO, that is, when PM regeneration flag Freg is set to 1. PM regeneration is implemented by raising the exhaust gas temperature to burn particulate matter in DPF 33. Accordingly, the engine system is operated in the split retard combustion mode. Second fuel injection timing ITm is controlled to raise the exhaust gas temperature and to raise DPF temperature up to a temperature at which PM is burned, such as 600° C. in the shown embodiment. This routine determines first fuel injection timing ITp and second fuel injection timing ITm.

At step S101 in FIG. 12, ECU 41 reads DPF temperature Tdpf. Next, the routine proceeds to step S102.

Figure 18:
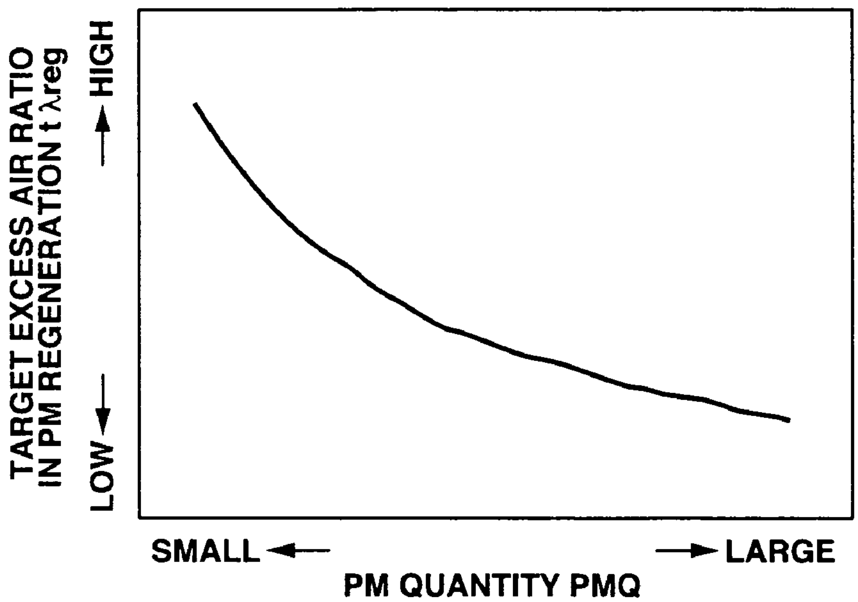
FIG. 18 is a representation of a table of a relationship between a PM quantity PMQ and a target excess air ratio in PM regeneration tλreg in accordance with the embodiment of the present invention.
Figure 19:
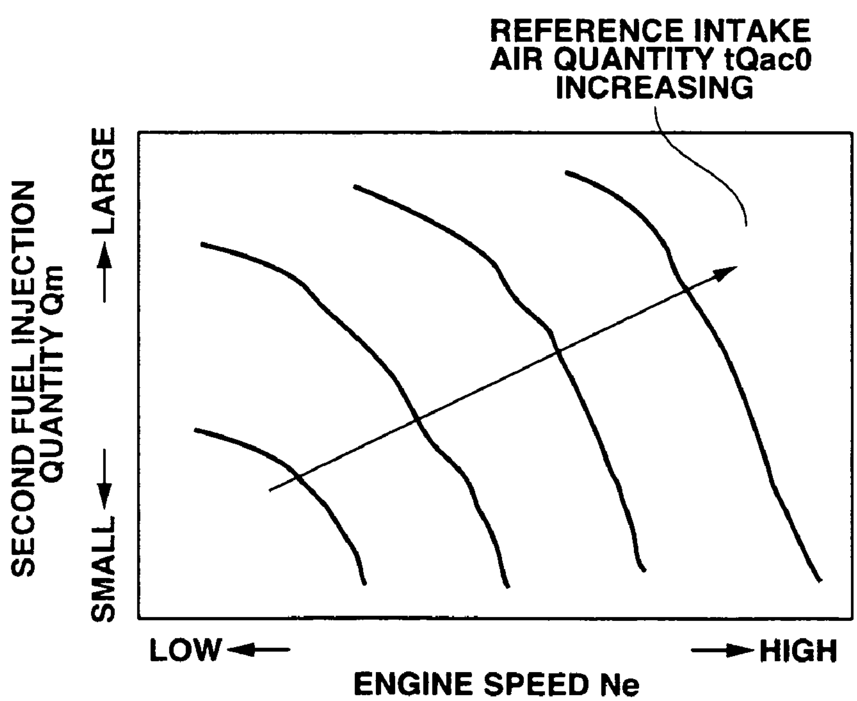
FIG. 19 is a representation of a map of a relationship among a reference intake air quantity tQac0, engine speed Ne, and second fuel injection quantity Qm in accordance with the embodiment of the present invention.
Figure 20:
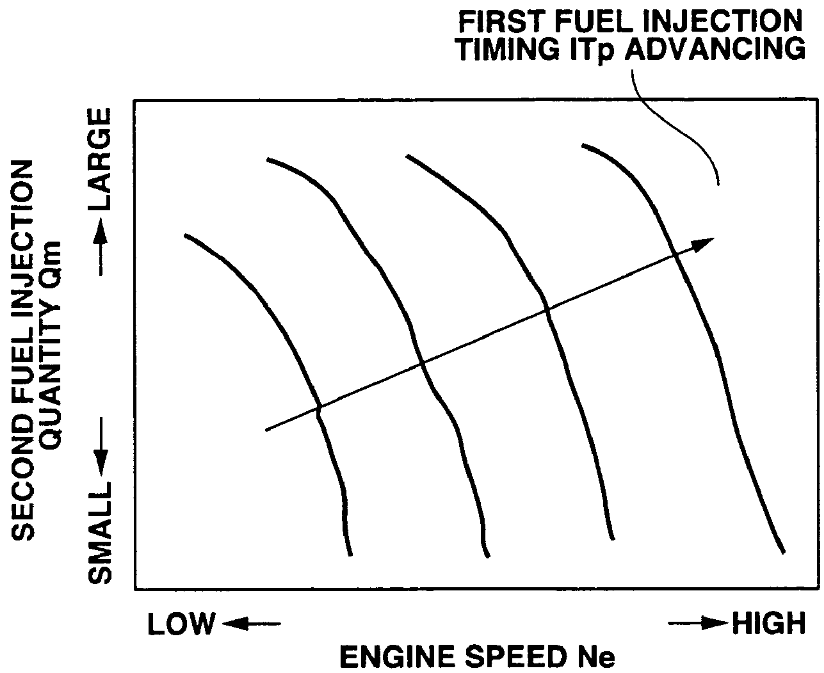
FIG. 20 is a representation of a map of a relationship among a first fuel injection timing ITp, the engine speed Ne, and second fuel injection quantity Qm in accordance with the embodiment of the present invention.
Figure 21:
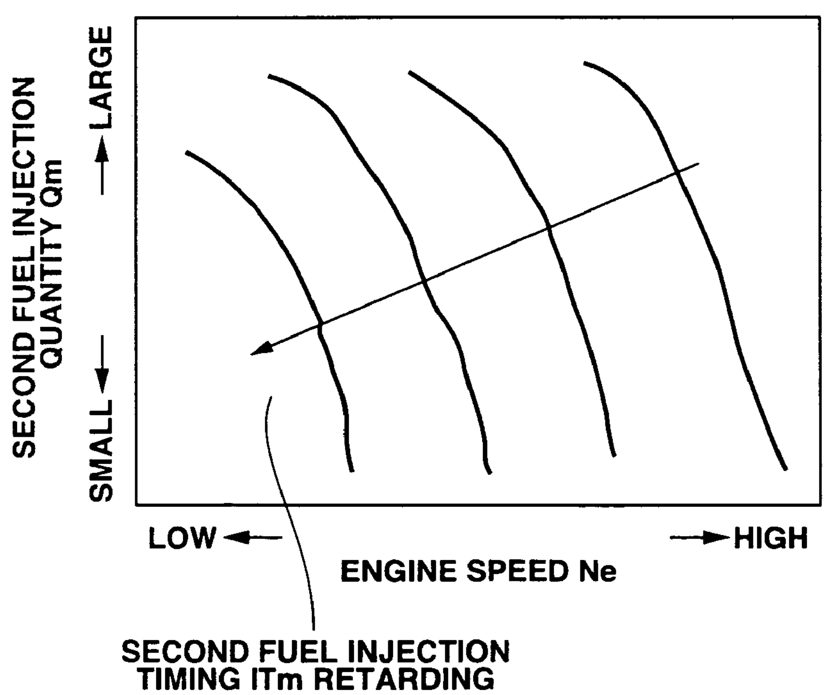
FIG. 21 is a representation of a map of a relationship among a second fuel injection timing ITm, engine speed Ne, and second fuel injection quantity Qm in accordance with the embodiment of the present invention.

At step S102, ECU 41 controls excess air ratio λ to target excess air ratio tλ, which is determined in accordance with PM quantity PMQ in DPF 33. Excess air ratio λ is controlled by actuating throttle valve 15 and EGR valve 35. A target excess air ratio in PM regeneration tλreg is calculated or retrieved from a table as shown in FIG. 18 as a function of PM quantity PMQ. Target excess air ratio tλreg decreases with increasing PM quantity PMQ. Target excess air ratio tλreg is generally within a rage from 1 to 1.4, in the shown embodiment. Reference intake air quantity tQac0, which is corresponding to the stoichiometric air excess ratio, is calculated or retrieved from a map as shown in FIG. 19 as a function of engine speed Ne and second fuel injection quantity Qm. Reference intake air quantity tQac0 increases with increasing engine speed Ne and increasing second fuel injection quantity Qm. Reference intake air quantity tQac0 is multiplied by target excess air ratio tλreg to produce a target intake air quantity tQac (tQac=tQac0×tλreg). ECU 41 controls throttle valve 15 in accordance with target intake air quantity tQac. The difference between an actual excess air ratio and target excess air ratio tλreg is determined based on a feedback signal from oxygen sensor 52. ECU 41 controls EGR valve 35 to reduce the difference. PM quantity PMQ is estimated based on exhaust gas pressure Pexh. First fuel injection timing ITp is calculated or retrieved from a map as shown in FIG. 20 as a function of engine speed Ne and second fuel injection quantity Qm. First fuel injection timing ITp is advanced with increasing engine speed Ne and increasing second fuel injection quantity Qm. Second fuel injection timing ITm is calculated or retrieved from a map as shown in FIG. 21 as a function of engine speed Ne and second fuel injection quantity Qm. Second fuel injection timing ITm is retarded with decreasing engine speed Ne and decreasing second fuel injection quantity Qm.

Figure 22:
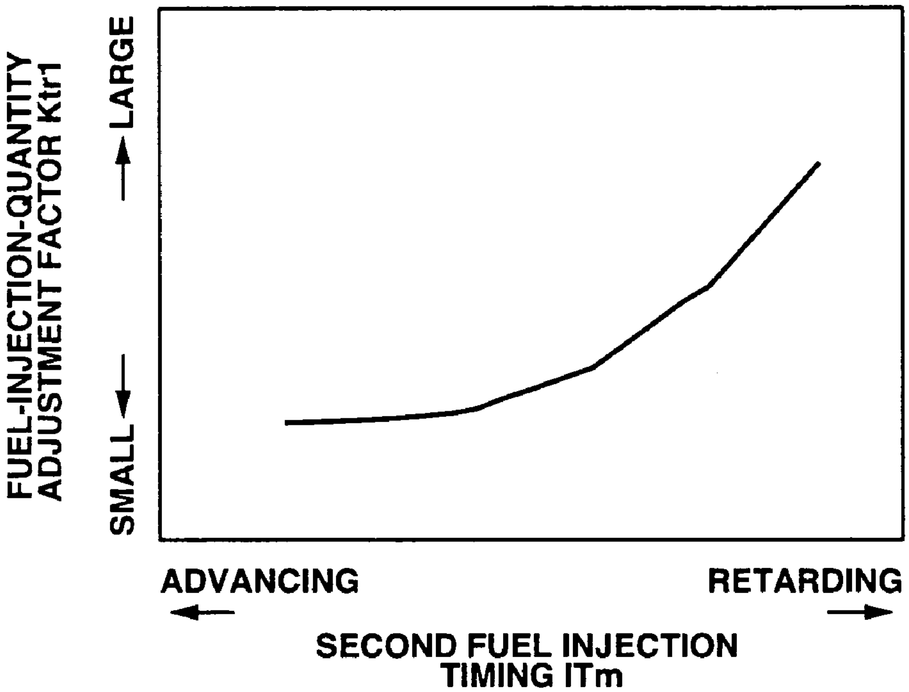
FIG. 22 is a representation of a table of a relationship between a fuel injection quantity adjustment factor Ktr1 and second fuel injection timing ITm in accordance with the embodiment of the present invention.
Figure 23:
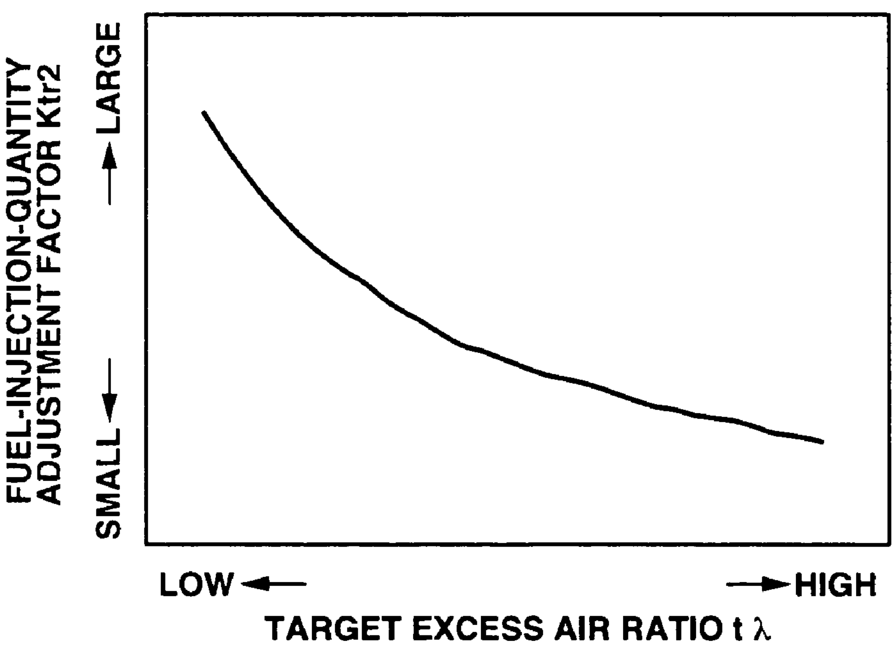
FIG. 23 is a representation of a table of a relationship between a fuel injection quantity adjustment factor Ktr2 and target excess air ratio tλ in accordance with the embodiment of the present invention.

Thus, second fuel injection timing ITm is much later than the start timing of main fuel injection in the normal combustion mode. Accordingly, second fuel injection quantity Qm and target intake air quantity tQac are adjusted in accordance with second fuel injection timing ITm, to reduce a change of engine output torque in accordance with retarding second fuel injection timing ITm. A fuel injection quantity adjustment factor Ktr1 is calculated or retrieved from a table as shown in FIG. 22 as a function of second fuel injection timing ITm. Second fuel injection quantity Qm is multiplied by fuel injection quantity adjustment factor Ktr1 to produce an adjusted second fuel injection quantity Qm. Fuel injection quantity adjustment factor Ktr1 increases with retarding second fuel injection timing ITm. In addition, second fuel injection quantity Qm and target intake air quantity tQac are adjusted in accordance with target excess air ratio tλ to reduce an increase in pumping loss in accordance with decreasing excess air ratio. Second fuel injection quantity Qm is multiplied by fuel injection quantity adjustment factor Ktr2 to produce an adjusted second fuel injection quantity Qm. A fuel injection quantity adjustment factor Ktr2 is calculated or retrieved from a table as shown in FIG. 23 as a function of target excess air ratio tλ.

At step S103, a check is made to determine whether DPF temperature Tdpf is enough to burn PM in DPF 33. Actually, it is determined whether or not DPF temperature Tdpf is higher than or equal to a predetermined threshold temperature T21 such as 600° C. When the answer to step S103 is YES, the routine proceeds to step S104. On the other hand, when the answer to step S103 is NO, the routine proceeds to step S108.

At step S108, ECU 41 retards second fuel injection timing ITm based on a map as shown in FIG. 21, to raise the exhaust gas temperature. Next, the routine proceeds to step S109. At step S109, ECU 41 determines fuel injection quantity adjustment factor Ktr1 based on second fuel injection timing ITm determined through S108, using a map as shown in FIG. 22. Second fuel injection quantity Qm is multiplied by fuel injection quantity adjustment factor Ktr1 to produce an adjusted second fuel injection quantity Qm. Next, the routine returns.

At step S104, a check is made to determine whether or not DPF temperature Tdpf is lower than or equal to a predetermined threshold temperature T22. Temperature T22 is set to a temperature below which thermal load applied to DPF 33 is within acceptable limits, such as 700° C. When the answer to step S104 is YES, the routine proceeds to step S105. On the other hand, when the answer to step S104 is NO, the routine proceeds to step S110.

At step S110, ECU 41 retards second fuel injection timing ITm based on a map as shown in FIG. 21, to raise the exhaust gas temperature. Next, the routine proceeds to step S111.

At step S111, ECU 41 determines fuel injection quantity adjustment factor Ktr1 based on second fuel injection timing ITm determined through S110, using a map as shown in FIG. 22. Second fuel injection quantity Qm is multiplied by fuel injection quantity adjustment factor Ktr1 to produce an adjusted second fuel injection quantity Qm. Next, the routine returns.

At step S105, a check is made to determine whether or not a predetermined time period treg is elapsed after the split retard combustion mode starts at step S108 or S10. When the answer to step S105 is YES, the routine proceeds to step S106. On the other hand, when the answer to step S105 is NO, the routine returns. PM is burned during DPF temperature Tdpf being held within the target range, that is, between temperatures T21 and T22.

At step S106, PM regeneration flag Freg is reset to zero, to switch the operating mode to the normal combustion mode. PM quantity PMQ is also reset to zero. Next, the routine proceeds to step S107.

At step S107, breakdown avoidance flag Frec is set to 1. With breakdown avoidance flag Frec set, the engine is operated preventing breakdown or overheating of DPF 33. If excess air ratio is immediately set to a normal value λ with part of PM unburned, there is a possibility that unburned PM is rapidly burned to impose a large heat load to DPF 33 and to cause a breakdown of DPF 33.

Referring now to FIG. 20, there is shown a flow chart depicting a process of S regeneration. S regeneration is implemented by controlling exhaust gas to fuel-rich condition to supply reducing agent to NOx trap 32, and by raising the exhaust gas temperature to promote dissociation of S. Actually, the engine is operated in the split retard combustion mode to execute S regeneration. In the shown embodiment, NOx trap 32 includes a catalyst of the Ba type. It is necessary to raise the catalyst over 650° C. for S regeneration. This routine determines first fuel injection timing ITp and second fuel injection timing ITm.

At step S201, ECU 41 reads NOx trap temperature Tnox. Next, the routine proceeds to step S202.

At step S202, ECU 41 controls excess air ratio λ to target excess air ratio tλdesul (=1, in the shown embodiment). Excess air ratio λ is controlled by actuating throttle valve 15 and EGR valve 35. Reference intake air quantity tQac0, which is corresponding to the stoichiometric air excess ratio, is calculated or retrieved from a map as shown in FIG. 19 as a function of engine speed Ne and second fuel injection quantity Qm. Reference intake air quantity tQac (tQac=tQac0) increases with increasing engine speed Ne and increasing second fuel injection quantity Qm. ECU 41 controls throttle valve 15 in accordance with target intake air quantity tQac. First fuel injection timing ITp is calculated or retrieved from a map as shown in FIG. 20 as a function of engine speed Ne and second fuel injection quantity Qm. Second fuel injection timing ITm is determined using maps as shown in FIG. 21. Fuel injection quantity adjustment factor Ktr1 and fuel injection quantity adjustment factor Ktr2 for reducing an increase in pumping loss are derived from tables as shown in FIGS. 22 and 23. Second fuel injection quantity Qm is multiplied by fuel injection quantity adjustment factor Ktr1 and fuel injection quantity adjustment factor Ktr2 to produce an adjusted second fuel injection quantity Qm.

At step S203, a check is made to determine whether or not NOx trap temperature Tnox is higher than or equal to a predetermined threshold temperature T12. Temperature T12 is set to a minimum temperature needed to dissociate S, such as 650° C. When the answer to step S203 is YES, the routine proceeds to step S204. On the other hand, when the answer to step S203 is NO, the routine proceeds to step S208.

At step S208, ECU 41 retards second fuel injection timing ITm based on a map as shown in FIG. 21, to raise the exhaust gas temperature. Next, the routine proceeds to step S209.

At step S209, ECU 41 determines fuel injection quantity adjustment factor Ktr1 based on second fuel injection timing ITm determined through step S208, using a map as shown in FIG. 22. Second fuel injection quantity Qm is multiplied by fuel injection quantity adjustment factor Ktr1 to produce an adjusted second fuel injection quantity Qm. Next, the routine returns.

At step S204, a check is made to determine whether or not a predetermined time period tdesul is elapsed after the split retard combustion mode starts at step S208. When the answer to step S204 is YES, the routine proceeds to step S205. On the other hand, when the answer to step S204 is NO, the routine returns. S is dissociated and released from NOx trap 32 during NOx trap temperature Tnox being held within the target range, that is, above T13. Released from NOx trap 32, S is purified by reducing agent in exhaust gas.

At step S205, S regeneration flag Fdesul is reset to zero, to switch the operating mode to the normal combustion mode. S quantity SOX is also reset to zero. Next, the routine proceeds to step S206.

At step S206, NOx quantity NOX is reset to zero, and NOx regeneration request flag rqSP reset to zero. Next, the routine proceeds to step S206.

At step S207, breakdown avoidance flag Frec is set to 1. With breakdown avoidance flag Frec set, the engine is operated preventing breakdown of DPF 33. If excess air ratio is immediately set to a normal value λ with PM partly unburned, there is a possibility that PM unburned is rapidly burned to impose a large heat load to DPF 33.

Figure 25:
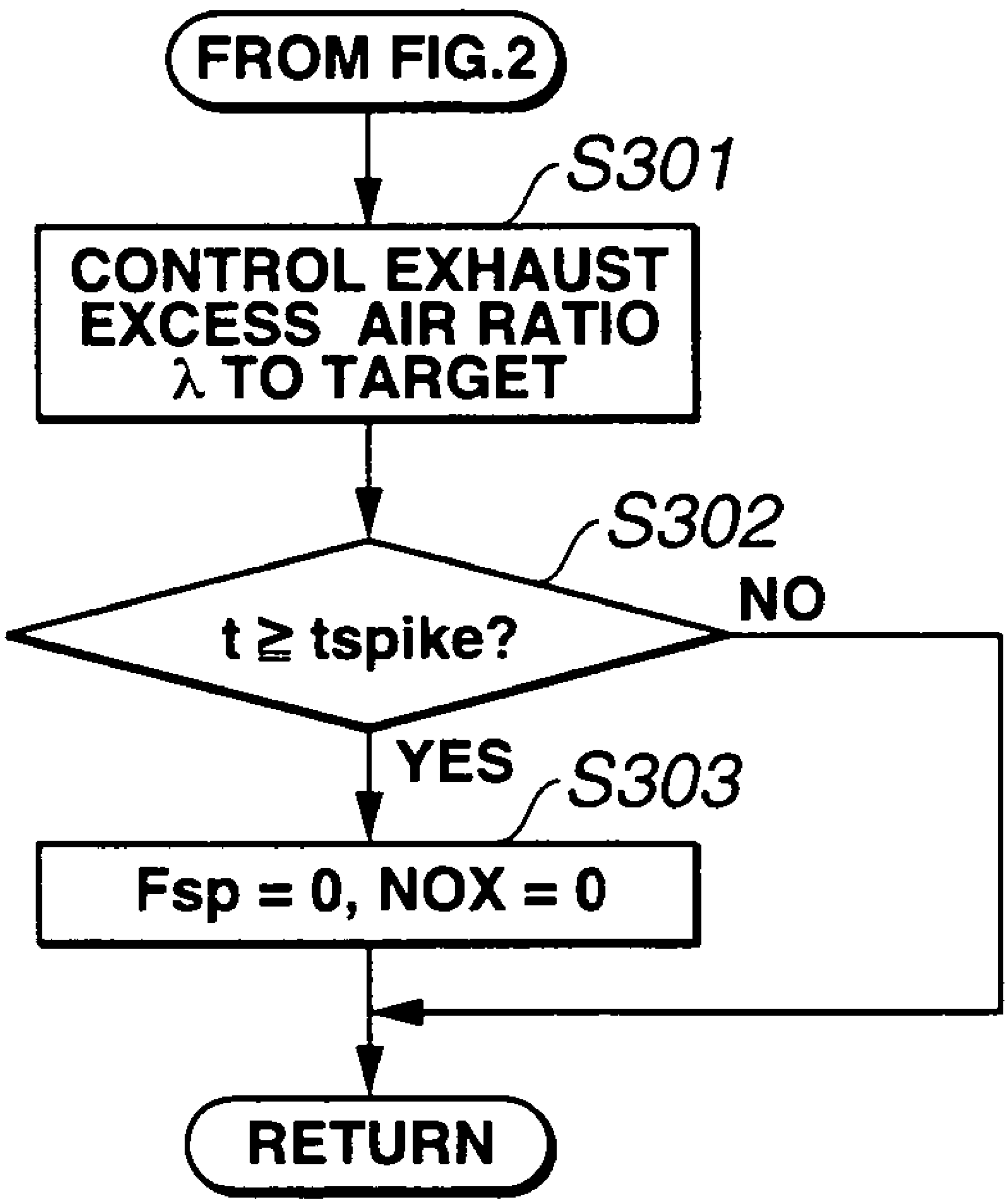
FIG. 25 is a flow chart depicting a process of NOx regeneration in accordance with the embodiment of the present invention.

Referring now to FIG. 25, there is shown a flow chart depicting a process of NOx regeneration. NOx regeneration is implemented by controlling exhaust gas to fuel-rich condition to supply reducing agent to NOx trap 32. Actually, the engine is operated in the split retard combustion mode to execute NOx regeneration. In NOx regeneration, it is not desired to raise the exhaust gas temperature as in S regeneration. On the other hand, the intake air quantity is decreased in NOx regeneration, to decrease the exhaust air fuel ratio, which tends to decrease the compression end temperature. Therefore, the split retard combustion mode is employed for countering this difficulty. This routine determines first fuel injection timing ITp and second fuel injection timing ITm.

At step S301, ECU 41 controls excess air ratio λ to target excess air ratio tλsp, which is determined for NOx regeneration. Target excess air ratio tλsp is set to a value lower than 1, such as 0.9, which indicates a fuel rich condition. Excess air ratio λ is controlled by actuating throttle valve 15 and EGR valve 35. Reference intake air quantity tQac0, which is corresponding to the stoichiometric air excess ratio, is calculated or retrieved from a map as shown in FIG. 19 as a function of engine speed Ne and second fuel injection quantity Qm. Reference intake air quantity tQac0 is multiplied by target excess air ratio tλsp to produce a target intake air quantity tQac (tQac=tQac0×tλsp). ECU 41 controls throttle valve 15 in accordance with target intake air quantity tQac. The difference between an actual excess air ratio and target excess air ratio tλreg is determined based on a feedback signal from oxygen sensor 52. ECU 41 controls EGR valve 35 to reduce the difference. First fuel injection timing ITp is calculated or retrieved from a map as shown in FIG. 20 as a function of engine speed Ne and second fuel injection quantity Qm. Second fuel injection timing ITm is determined based on maps as shown in FIG. 21. Fuel injection quantity adjustment factor Ktr1 and fuel injection quantity adjustment factor Ktr2 for reducing an increase in pumping loss are derived from tables as shown in FIGS. 22 and 23. Second fuel injection quantity Qm is multiplied by fuel injection quantity adjustment factor Ktr1 and fuel injection quantity adjustment factor Ktr2 to produce an adjusted second fuel injection quantity Qm.

At step S302, a check is made to determine whether or not a predetermined time period tspike is elapsed after the split retard combustion mode. NOx is dissociated and released from NOx trap 32 during time period tspike. Released from NOx trap 32, NOx is purified by reducing agent in exhaust gas. When the answer to step S302 is YES, the routine proceeds to step S303. On the other hand, when the answer to step S302 is NO, the routine returns.

At step S303, NOx regeneration flag Fsp is reset to zero, to switch the operating mode to the normal combustion mode. NOx quantity NOX is also reset to zero. Next, the routine returns.

Figure 26:
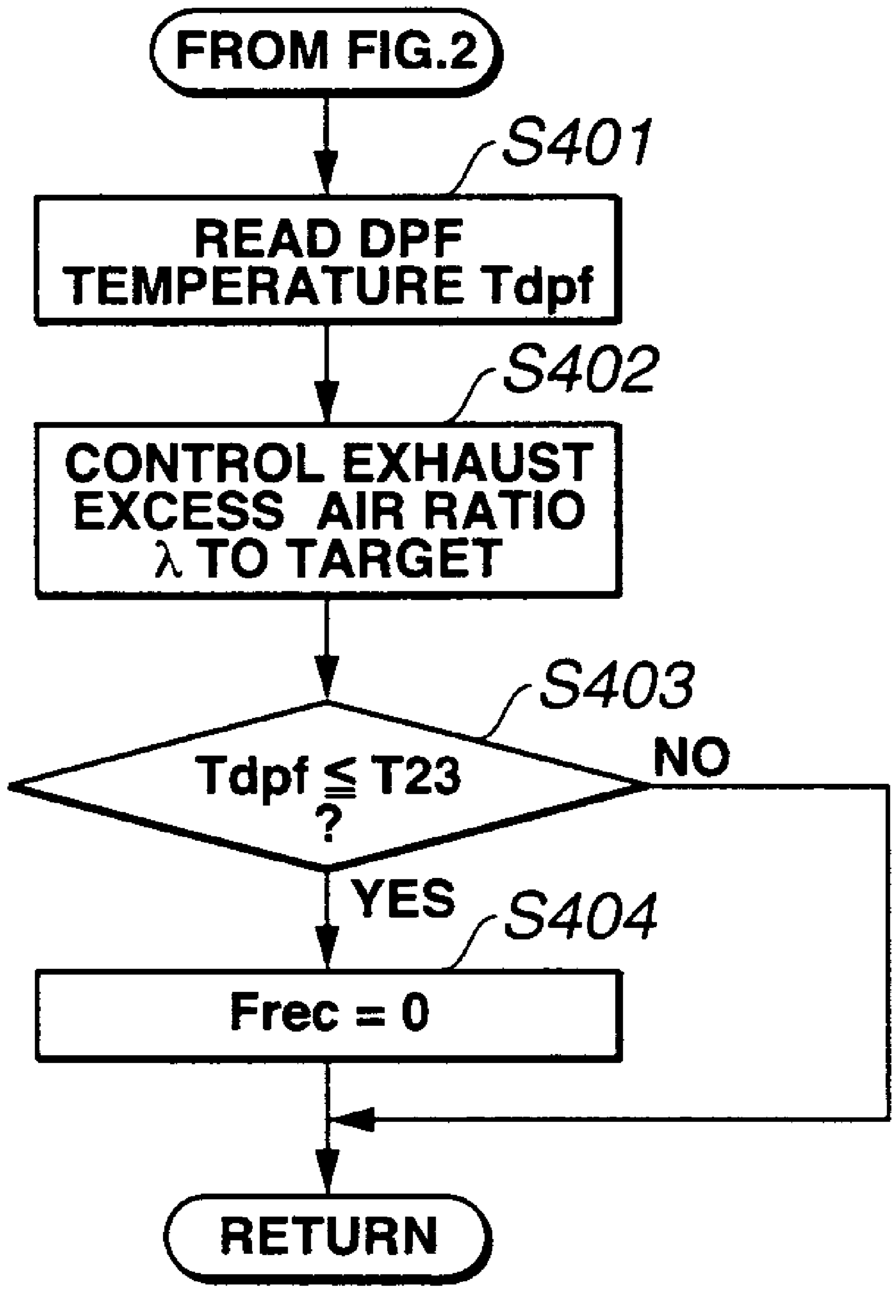
FIG. 26 is a flow chart depicting a process of avoiding damage in the exhaust purifier in accordance with the embodiment of the present invention.

Referring now to FIG. 26, there is shown a flow chart depicting a process of breakdown avoidance operation. Breakdown avoidance operation is implemented by controlling excess air ratio λ to a value higher than or equal to a value such as 1.4 (fuel-lean condition), which is higher than in PM regeneration or S regeneration. The normal combustion mode is employed to decrease the exhaust gas temperature.

At step S401, ECU 41 reads DPF temperature Tdpf. Next, the routine proceeds to step S402.

Figure 27:
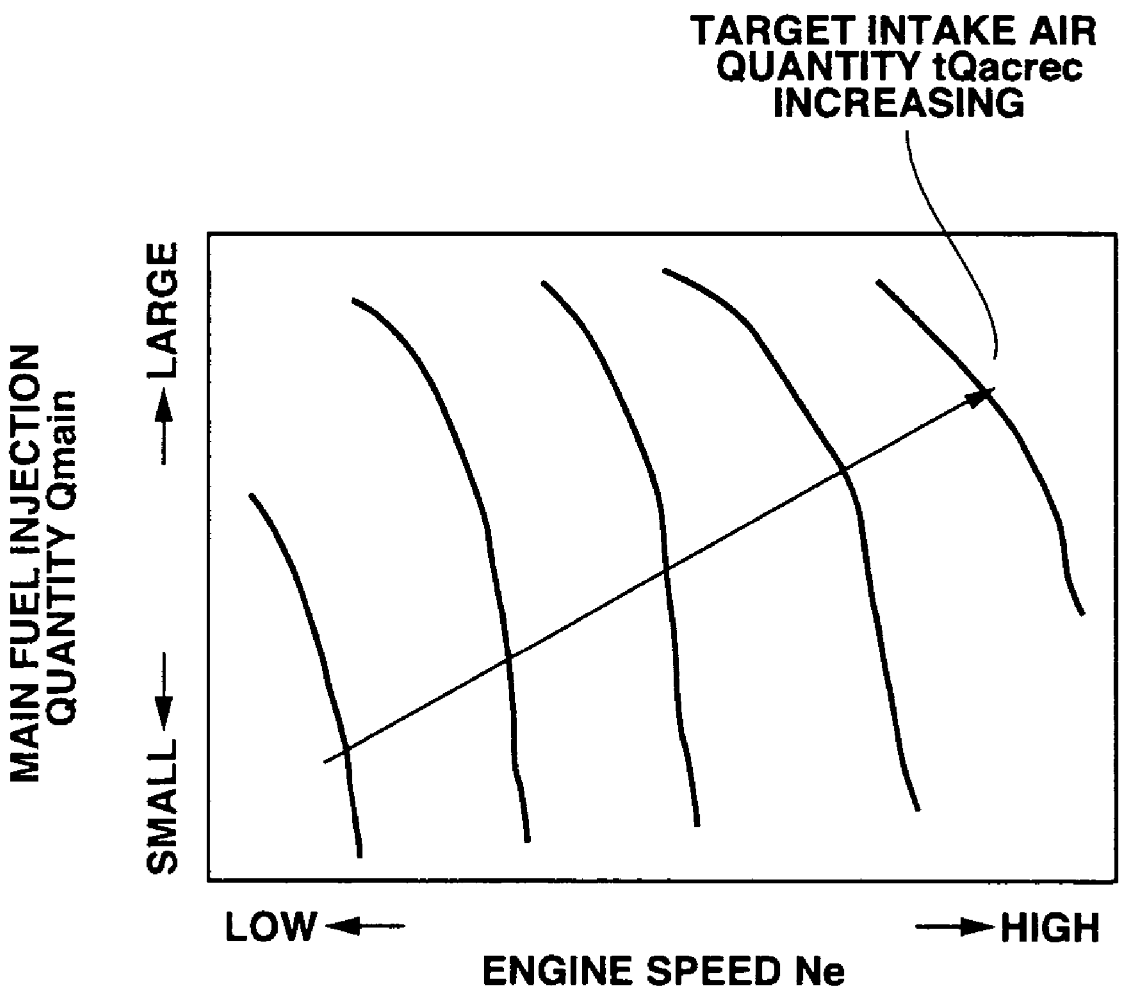
FIG. 27 is a representation of a map of a relationship among a target intake air quantity in breakdown avoidance mode tQacrec, engine speed Ne, and a main fuel injection quantity Qmain in accordance with the embodiment of the present invention.

At step S402, ECU 41 controls excess air ratio λ to target excess air ratio tλrec, which is determined for breakdown avoidance operation. Target intake air quantity tQacrec is calculated or retrieved from a map as shown in FIG. 27 as a function of engine speed Ne and main fuel injection quantity Qmain. Next, the routine proceeds to step S403.

At step S403, a check is made to determine whether or not DPF temperature Tdpf is lower than or equal to a predetermined temperature T23. When the answer to step S302 is YES, it is determined that there is no possibility of burning unburned PM rapidly, and the routine proceeds to step S404. On the other hand, when the answer to step S403 is NO, the routine returns.

At step S404, breakdown avoidance flag Frec is reset to zero, to switch the operating mode to the normal combustion mode. Next, the routine returns.

Figure 28:
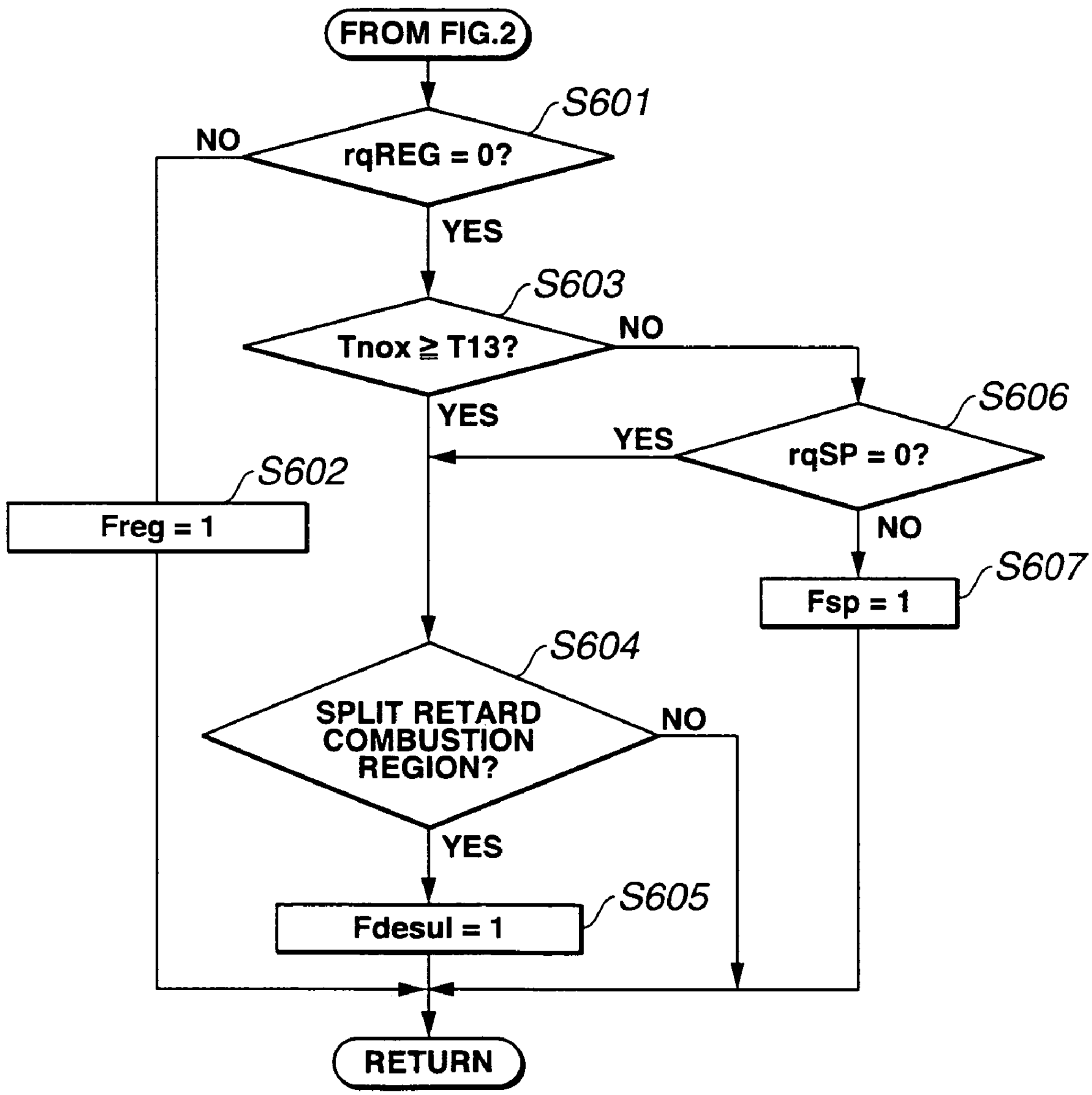
FIG. 28 is a flow chart depicting a first process of setting operating mode flags in accordance with the embodiment of the present invention.
Figure 30:
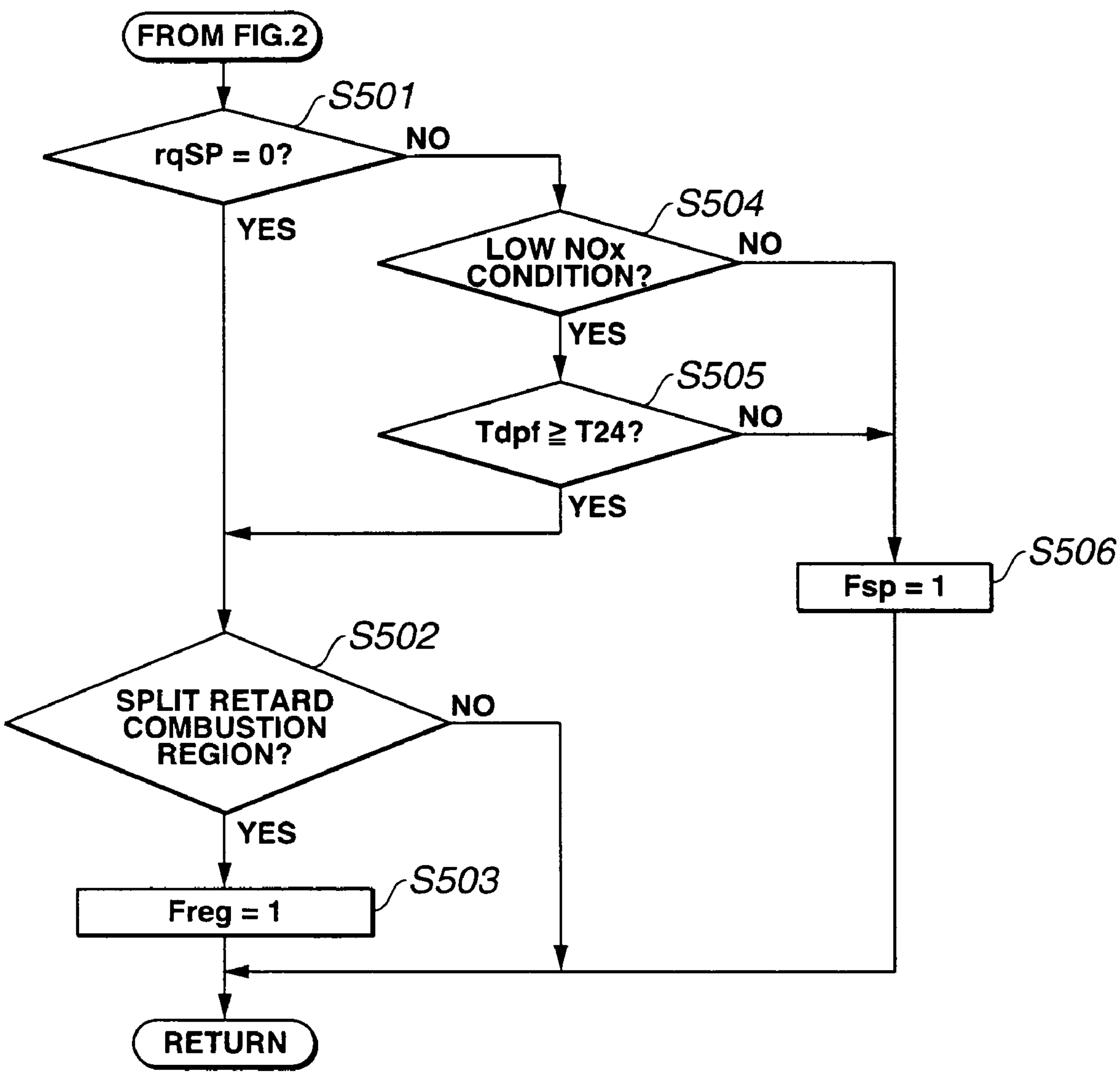
FIG. 30 is a flow chart depicting a second process of setting operating mode flags in accordance with the embodiment of the present invention.
Figure 31:
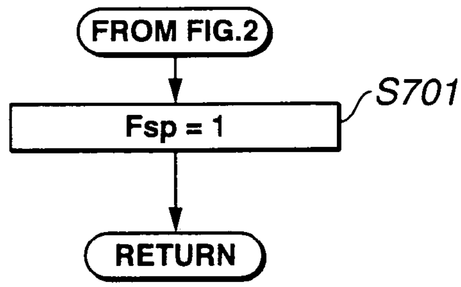
FIG. 31 is a flow chart depicting a third process of setting operating mode flags in accordance with the embodiment of the present invention.

Referring now to FIGS. 28, 30, and 31, there is shown a process of setting regeneration flags. One of these routines is executed when at least one of PM regeneration request flag rqREG, S regeneration request flag rqDESUL, and NOx regeneration request flag rqSP is switched to 1. These routines determine a priority or an execution order of operations and set PM regeneration flag Freg, S regeneration flag Fdesul, or NOx regeneration flag Fsp, when a plurality of request flag are set.

The routine shown in FIG. 28 is executed when S regeneration request flag rqDESUL is equal to 1. At step S601, a check is made to determine whether or not PM regeneration request flag rqREG is equal to zero. When the answer to step S601 is YES, the routine proceeds to step S603. On the other hand, when the answer to step S601 is NO, the routine proceeds to step S602.

At step S602, PM regeneration flag Freg is set to 1. Next, the routine returns.

At step S603, a check is made to determine whether or not NOx trap temperature Tnox is higher than or equal to a predetermined threshold temperature T14. Temperature T14 is set to a minimum temperature at which the mode shift to S regeneration condition can be smoothly performed in a comparable short time period, and lower than target temperature for S regeneration T13. When the answer to step S603 is YES, the routine proceeds to step S604. On the other hand, when the answer to step S603 is NO, the routine proceeds to step S606.

Figure 29:
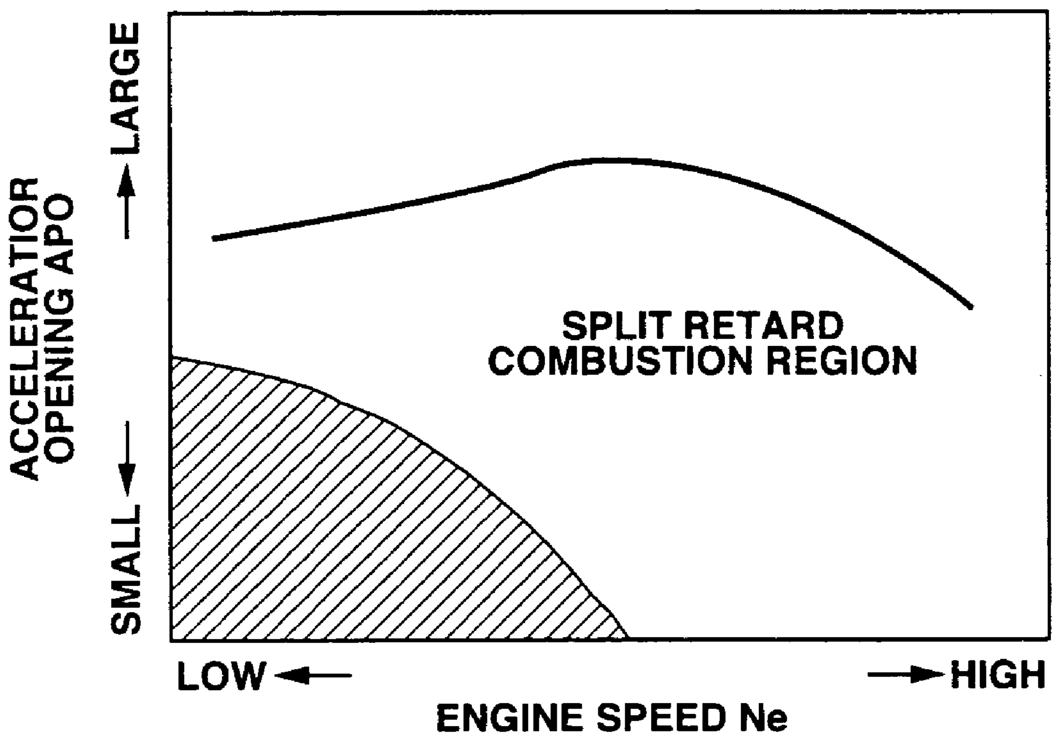
FIG. 29 is a representation of a map of a split retard combustion region in which the split retard combustion mode can be employed in accordance with the embodiment of the present invention.

At step S604, a check is made to determine whether or not the current operating condition is within the split retard combustion region in which the split retard combustion mode can be employed. The split retard combustion region is defined in accordance with engine speed Ne and accelerator opening APO based on a map as shown in FIG. 29. When the answer to step S604 is YES, the routine proceeds to step S605. On the other hand, when the answer to step S604 is NO, the routine returns.

At step S605, S regeneration flag Fdesul is set to 1. Next the routine returns.

At step S606, a check is made to determine whether or not NOx regeneration request flag rqSP is equal to zero. When the answer to step S606 is YES, the routine proceeds to step S604. On the other hand, when the answer to step S606 is NO, the routine proceeds to step S607, at which NOx regeneration flag Fsp is set to 1, and next returns. NOx regeneration gains a higher priority than S regeneration.

The routine shown in FIG. 30 is executed when PM regeneration request flag rqREG is equal to 1 and S regeneration request flag rqDESUL is equal to zero. At step S501, a check is made to determine whether or not NOx regeneration request flag rqSP is equal to zero. When the answer to step S501 is YES, the routine proceeds to step S502. On the other hand, when the answer to step S501 is NO, the routine proceeds to step S504.

At step S502, a check is made to determine whether or not the current operating condition is within a split retard combustion region in which the split retard combustion mode can be employed. The split retard combustion region is defined in accordance with engine speed Ne and accelerator opening APO based on a map as shown in FIG. 29. Under low speed and low load conditions, the mode shift to the split retard combustion mode is inhibited. When the answer to step S502 is YES, the routine proceeds to step S503. On the other hand, when the answer to step S502 is NO, the routine returns.

At step S503, PM regeneration flag Freg is set to 1. Next, the routine returns.

At step S504, a check is made to determine whether or not engine 1 is operated under a low NOx condition where the quantity of NOx in exhaust gas is small. It is determined, for example, in accordance with whether or not the operating condition of engine 1 is in a steady operating condition. That is, it is determined that NOx quantity is small during engine 1 being operated in a steady condition. When the answer to step S504 is YES, the routine proceeds to step S505. On the other hand, when the answer to step S504 is NO, the routine returns.

At step S505, a check is made to determine whether or not DPF temperature Tdpf is higher than or equal to a predetermined threshold temperature T24. Temperature T24 is set to a temperature at which DPF 33 is activated, below target temperature in PM regeneration T21. When the answer to step S505 is YES, the routine proceeds to step S502. On the other hand, when the answer to step S505 is NO, it is determined it takes a comparable time period to increase DPF temperature Tdpf, and the routine proceeds to step S506.

At step S506, NOx regeneration flag Fsp is set to 1.

The routine shown in FIG. 31 is executed when PM regeneration request flag rqREG and S regeneration request flag rqDESUL are equal to zero and NOx regeneration request flag rqSP is equal to 1. Therefore, NOx regeneration flag Fsp is set to 1.

Figure 35:
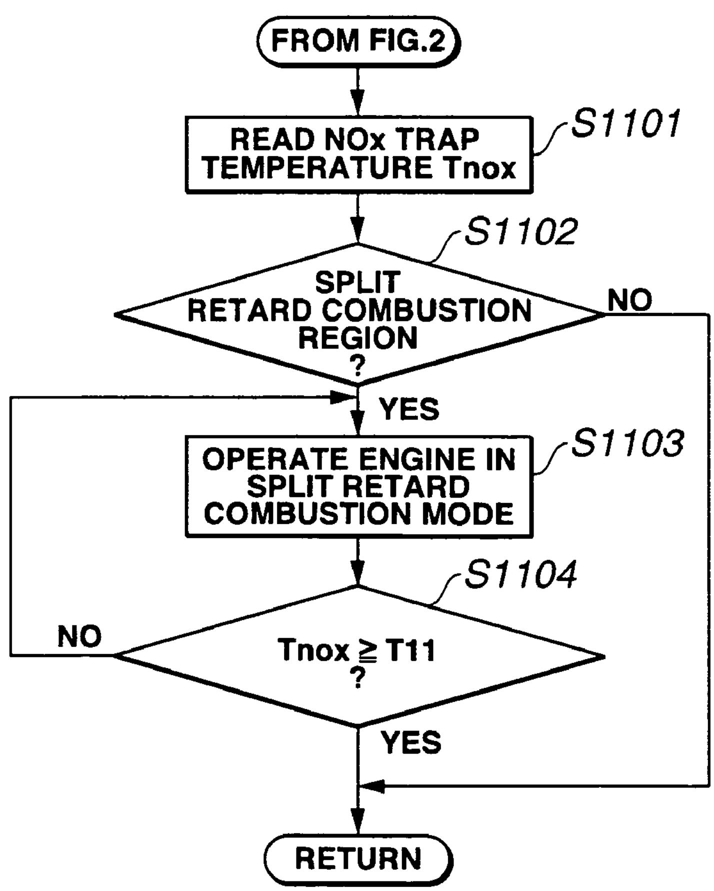
FIG. 35 is a flow chart depicting a process of rapid activation of the exhaust purifier in accordance with the embodiment of the present invention.

Referring now to FIG. 35, there is shown a process of rapid activation of the exhaust purifier. At step S1101, ECU 41 reads NOx trap temperature Tnox. Next, the routine proceeds to step S1102.

At step S1102, a check is made to determine whether or not the current operating condition is within the split retard combustion region by referring to a map as shown in FIG. 29. When the answer to step S1102 is YES, the routine proceeds to step S1103. On the other hand, when the answer to step S1102 is NO, the routine returns.

At step S1103, ECU 41 controls the engine system to the split retard combustion mode. In the split retard combustion mode, ECU 41 determines first fuel injection timing ITp and second fuel injection timing ITm based on maps shown in FIGS. 20 and 21. Retarding second fuel injection timing ITm results in raising the exhaust gas temperature and activating NOx trap 32. In addition, fuel injection quantity adjustment factor Ktr1 is determined based on a map as shown in FIG. 22. Second fuel injection quantity Qm is multiplied by fuel injection quantity adjustment factor Ktr1 to produce an adjusted second fuel injection quantity Qm. In the rapid activation, target excess air ratio tλ is set to a normal value as in the normal combustion mode. Next, the routine proceeds to step S1104.

At step S1104, a check is made to determine whether or not NOx trap temperature Tnox is higher than or equal to the threshold temperature T11. When the answer to step S1104 is YES, the routine returns. On the other hand, when the answer to step S1104 is NO, the routine repeats step S1103. After the routine returning, the combustion mode is shifted to the normal combustion mode (step S16).

The following describes effects produced by a combustion control apparatus for internal combustion engine in accordance to the embodiment of the present invention. First, PM regeneration of DPF 33, S regeneration, NOx regeneration, and the rapid activation, of NOx trap 32 are implemented by shifting the engine operating mode to the split retard combustion mode, in which the second fuel injection is executed at a late timing or crank angle than the main fuel injection in the normal combustion mode. This results in raising the exhaust gas temperature to warm NOx trap 32 to a target temperature. In PM regeneration mode or S regeneration mode, exhaust air fuel ratio is lowered by decreasing intake air quantity. The first fuel injection causes the preliminary combustion, which releases heat to raise incylinder temperature. This leads to a stable process of the main combustion.

Second, time interval Δtij between first and second fuel injection is adjusted so that the start timing of the main combustion follows the end timing of preliminary combustion. This raises the proportion of the premixed combustion. Lowering the excess air ratio in PM regeneration, NOx regeneration, and S regeneration reduces exhaust smoke, because the premixed combustion predominates in the main combustion.

Third, first fuel injection quantity Qp is increased to adjust the ignition lag of the preliminary combustion, when it is determined that the ignition lag of the preliminary combustion in time or in crank angle tends to increase in accordance with the factor for ignition lag such as target excess air ratio tλ. This ensures the preliminary combustion to produce a heat release needed to stabilize the main combustion.

In the shown embodiment, the engine includes separate NOx trap 32 and DPF 33. Alternatively, the engine may include an integral exhaust purifier. For example, the catalyst of NOx trap may be mounted on the filter element of DPF 33.

This application is based on a prior Japanese Patent Application No. 2003-284325 filed Jul. 31, 2003. The entire contents of this Japanese Patent Application No. 2003-284325 are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A combustion control apparatus for an internal combustion engine, comprising:

an exhaust purifier in an exhaust passage of the engine;

a combustion controlling actuator for causing combustion in a combustion chamber of the engine;

a controller for controlling the combustion controlling actuator; and the controller configured to perform the following:

switching a combustion mode between a normal combustion mode and a split retard combustion mode, in accordance with an condition of the exhaust purifier;

performing the following in the normal combustion mode:

producing normal combustion to generate an output torque of the engine; and performing the following in the split retard combustion mode:

producing preliminary combustion at or near top dead center, to release a predetermined quantity of heat in the combustion chamber;

starting main combustion at a timing later than a start timing of the normal combustion in the normal combustion mode, after an end of the preliminary combustion, to generate the output torque of the engine;

determining an ignition lag between a start timing of a first fuel injection for the preliminary combustion and a start timing of the preliminary combustion, in accordance with an operating condition of the engine; and adjusting a first fuel injection quantity of the first fuel injection, in accordance with the ignition lag of the preliminary combustion.

2. The combustion control apparatus as claimed in claim 1, wherein the controller is configured to increase the first fuel injection quantity in accordance with increasing ignition lag of the preliminary combustion, in the split retard combustion mode.

3. A combustion control apparatus for an internal combustion engine, comprising:

a fuel injector for injecting fuel directly into a combustion chamber of the engine;

a controller for controlling the fuel injector; and the controller configured to perform the following:

switching a combustion mode between a normal combustion mode and a split retard combustion mode, in accordance with an operating condition of the engine;

performing the following in the normal combustion mode:

controlling a normal fuel injection to produce normal combustion to generate an output torque of the engine; and performing the following in the split retard combustion mode:

controlling a first fuel injection to produce preliminary combustion at or near top dead center, to release a predetermined quantity of heat;

starting a second fuel injection at a timing later than a start timing of the normal fuel injection in the normal combustion mode, to start main combustion after an end of the preliminary combustion, to generate the output torque of the engine; and determining an ignition lag between a start timing of the first fuel injection and a start timing of the preliminary combustion, in accordance with the operating condition of the engine; and adjusting a first fuel injection quantity of the first fuel injection, in accordance with the ignition lag of the preliminary combustion.

4. The combustion control apparatus as claimed in claim 3, further comprising a condition sensor for collecting information needed to determine the operating condition of the engine.

5. The combustion control apparatus as claimed in claim 4, wherein the controller is configured to perform the following in the split retard combustion mode:

determining a variable in correlation with the ignition lag of the preliminary combustion, in accordance with the operating condition of the engine; and determining the ignition lag of the preliminary combustion, in accordance with the variable.

6. The combustion control apparatus as claimed in claim 5, wherein the controller is configured to increase the first fuel injection quantity in accordance with increasing ignition lag of the preliminary combustion, in the split retard combustion mode.

7. The combustion control apparatus as claimed in claim 5, wherein the controller is configured to perform the following in the split retard combustion mode:

determining an incylinder temperature at top dead center of compression stroke as a variable in correlation with the ignition lag of the preliminary combustion; and increasing the first fuel injection quantity in accordance with decreasing incylinder temperature at top dead center of compression stroke.

8. The combustion control apparatus as claimed in claim 5, wherein the controller is configured to perform the following in the split retard combustion mode:

determining an EGR rate as a variable in correlation with the ignition lag of the preliminary combustion; and increasing the first fuel injection quantity in accordance with increasing EGR rate.

9. The combustion control apparatus as claimed in claim 5, wherein the controller is configured to perform the following in the split retard combustion mode:

determining an engine speed as a variable in correlation with the ignition lag of the preliminary combustion; and increasing the first fuel injection quantity in accordance with increasing engine speed.

10. The combustion control apparatus as claimed in claim 5, wherein the controller is configured to perform the following in the split retard combustion mode:

determining a property of fuel as a variable in correlation with the ignition lag of the preliminary combustion;

determining an ignition quality of fuel, in accordance with the property of fuel; and increasing the first fuel injection quantity in accordance with decreasing ignition quality of fuel.

11. The combustion control apparatus as claimed in claim 10, wherein the property of fuel is a specific gravity of fuel.

12. The combustion control apparatus as claimed in claim 5, wherein the controller is configured to perform the following in the split retard combustion mode:

determining an excess air ratio as a variable in correlation with the ignition lag of the preliminary combustion; and increasing the first fuel injection quantity in accordance with decreasing excess air ratio.

13. The combustion control apparatus as claimed in claim 3, further comprising an exhaust purifier in an exhaust gas passage of the engine, wherein the condition sensor senses information needed to determine the condition of the exhaust purifier; and the controller is configured to switch the combustion mode, in accordance with the condition of the exhaust purifier.

14. The combustion control apparatus as claimed in claim 13, wherein the condition of the exhaust purifier includes a quantity of a trapped substance in the exhaust purifier.

15. The combustion control apparatus as claimed in claim 13, wherein the exhaust purifier comprises at least one of a particulate filter and a NOx trap.

16. The combustion control apparatus as claimed in claim 15, wherein the exhaust purifier comprises one of the particulate filter and the NOx trap; and the controller is configured to perform the following:

producing a regeneration request for regenerating an associated one of the particulate filter and the NOx trap, in accordance with the condition of the exhaust purifier; and selecting the split retard combustion mode in response to the regeneration request.

17. The combustion control apparatus as claimed in claim 15, wherein the exhaust purifier comprises both of the particulate filter and the NOx trap; and the controller is configured to perform the following:

producing a PM regeneration request for regenerating the particulate filter, in accordance with the condition of the exhaust purifier;

producing a NOx regeneration request for regenerating the NOx trap, in accordance with the condition of the exhaust purifier; and selecting the split retard combustion mode in response to the PM regeneration request and the NOx regeneration request.

18. The combustion control apparatus as claimed in claim 3, wherein the controller is configured to perform the following in the split retard combustion mode:

determining a basic quantity of the first fuel injection quantity, in accordance with an engine speed and an a second fuel injection quantity of the second fuel injection; and adjusting the first fuel injection quantity, based on the basic quantity of the first fuel injection quantity.

19. The combustion control apparatus as claimed in claim 18, wherein the controller is configured to perform the following in the split retard combustion mode:

increasing the basic quantity of the first fuel injection quantity, in accordance with decreasing engine speed, and in accordance with decreasing second fuel injection quantity.

20. A combustion control apparatus for an internal combustion engine, comprising:

exhaust purifying means for purifying exhaust gas;

combustion controlling means for causing combustion in a combustion chamber of the engine;

control means for controlling the combustion controlling means; and the control means configured to perform the following:

switching a combustion mode between a normal combustion mode and a split retard combustion mode, in accordance with an condition of the exhaust purifier;

performing the following in the normal combustion mode: producing normal combustion to generate an output torque of the engine; and performing the following in the split retard combustion mode:

producing preliminary combustion at or near top dead center, to release a predetermined quantity of heat in the combustion chamber;

starting main combustion at a timing later than a start timing of the normal combustion in the normal combustion mode, after an end of the preliminary combustion, to generate the output torque of the engine;

determining an ignition lag between a start timing of a first fuel injection for the preliminary combustion and a start timing of the preliminary combustion, in accordance with an operating condition of the engine; and adjusting a first fuel injection quantity of the first fuel injection, in accordance with the ignition lag of the preliminary combustion.

21. A method of controlling combustion for an internal combustion engine including an exhaust purifier, the method comprising:

switching a combustion mode between a normal combustion mode and a split retard combustion mode, in accordance with an condition of the exhaust purifier;

performing the following in the normal combustion mode:

producing normal combustion to generate an output torque of the engine; and performing the following in the split retard combustion mode:

producing preliminary combustion at or near top dead center, to release a predetermined quantity of heat in the combustion chamber;

starting main combustion at a timing later than a start timing of the normal combustion in the normal combustion mode, after an end of the preliminary combustion, to generate the output torque of the engine;

determining an ignition lag between a start timing of a first fuel injection for the preliminary combustion and a start timing of the preliminary combustion, in accordance with an operating condition of the engine; and adjusting a first fuel injection quantity of the first fuel injection, in accordance with the ignition lag of the preliminary combustion.

* * * * *